(12) United States Patent
Kost et al.

(10) Patent No.: US 12,122,113 B2
(45) Date of Patent: Oct. 22, 2024

(54) VERSATILE SIPE MACHINE

(71) Applicant: BRIDGESTONE BANDAG, LLC, Nashville, TN (US)

(72) Inventors: Troy A. Kost, Muscatine, IA (US); Jim L. Jones, Muscatine, IA (US); Robert G. Otting, Muscatine, IA (US); Logan M. Koepke, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 18/275,464

(22) PCT Filed: Feb. 2, 2022

(86) PCT No.: PCT/US2022/070472
§ 371 (c)(1),
(2) Date: Aug. 2, 2023

(87) PCT Pub. No.: WO2022/170320
PCT Pub. Date: Aug. 11, 2022

(65) Prior Publication Data
US 2024/0034017 A1 Feb. 1, 2024

Related U.S. Application Data

(60) Provisional application No. 63/145,310, filed on Feb. 3, 2021.

(51) Int. Cl.
*B29D 30/68* (2006.01)
*B26D 1/00* (2006.01)

(52) U.S. Cl.
CPC .......... *B29D 30/68* (2013.01); *B26D 1/0006* (2013.01); *B26D 2001/0053* (2013.01); *B26D 2001/006* (2013.01)

(58) Field of Classification Search
CPC ................................ B29D 2030/685
See application file for complete search history.

(56) References Cited

U.S. PATENT DOCUMENTS

| | | |
|---|---|---|
| 3,328,849 A | 7/1967 | Stover et al. |
| 3,820,580 A | 6/1974 | Meserve et al. |

(Continued)

FOREIGN PATENT DOCUMENTS

| | | |
|---|---|---|
| DE | 19827244 A1 | 12/1999 |
| EP | 0 119 839 A2 | 9/1984 |

(Continued)

OTHER PUBLICATIONS

Neumann, A. et al., DE102006036509A1, with attached machine-translation to English by GooglePatents, Aug. 4, 2006. ( Year: 2006).*

(Continued)

*Primary Examiner* — S. Behrooz Ghorishi
*Assistant Examiner* — Gregory C. Grosso

(57) ABSTRACT

A sipe forming assembly is provided. The sipe forming assembly includes a plunge cutting assembly, a leading roller assembly positioned upstream of the plunge cutting assembly, and a trailing roller assembly positioned downstream of the plunge cutting assembly. The plunge cutting assembly includes a blade and a linear actuator configured to actuate the blade to cut a sipe in a tire tread. The leading roller assembly includes a first leading roller and a second leading roller positionable relative to the first leading roller. The second leading roller and the first leading roller are configured to cooperate to clamp the tire tread between the first leading roller and the second leading roller. The trailing roller assembly includes a first trailing roller and a second trailing roller configured to cooperate to clamp the tire tread between the first trailing roller and the second trailing roller.

18 Claims, 24 Drawing Sheets

(56) References Cited

U.S. PATENT DOCUMENTS

| | | |
|---|---|---|
| 4,306,607 A | 12/1981 | Curry |
| 4,353,402 A | 10/1982 | Burche et al. |
| 4,609,026 A | 9/1986 | Kondoh |
| 6,478,062 B1 | 11/2002 | Schomburg |
| 6,571,844 B1 | 6/2003 | Ochi et al. |
| D478,864 S | 8/2003 | Hiroko |
| 6,609,417 B1 | 8/2003 | Cantu et al. |
| D505,384 S | 5/2005 | Kageyama |
| D516,014 S | 2/2006 | Fukunaga |
| D517,002 S | 3/2006 | Welbes |
| D550,610 S | 9/2007 | Guspodin et al. |
| D559,773 S | 1/2008 | Campana |
| 7,467,652 B2 | 12/2008 | Knispel et al. |
| D586,732 S | 2/2009 | Heinen et al. |
| D589,438 S | 3/2009 | Heinen et al. |
| D610,530 S | 2/2010 | Perdriat |
| D633,861 S | 3/2011 | Shan et al. |
| D644,600 S | 9/2011 | Nicolas et al. |
| D656,890 S | 4/2012 | Rittweger |
| 9,278,582 B2 | 3/2016 | Stuckey |
| 9,434,214 B2 | 9/2016 | Iwamura |
| 9,463,672 B2 | 10/2016 | Mathonet et al. |
| 9,878,584 B2 | 1/2018 | Martin et al. |
| D816,597 S | 5/2018 | Schoeppner et al. |
| D816,599 S | 5/2018 | Dixon et al. |
| D821,964 S | 7/2018 | Speziari et al. |
| 10,166,820 B2 | 1/2019 | Asayama |
| D860,928 S | 9/2019 | Dixon et al. |
| D875,660 S | 2/2020 | Thieman |
| D886,034 S | 6/2020 | Pribula et al. |
| 10,780,662 B2 | 9/2020 | Coel et al. |
| 10,906,359 B2 | 2/2021 | Korkama et al. |
| 11,077,718 B2 | 8/2021 | Li |
| D943,506 S | 2/2022 | Toscano et al. |
| D958,727 S | 7/2022 | Pribula |
| 2003/0070742 A1* | 4/2003 | Risser ............... B29D 30/58  156/405.1 |
| 2007/0272337 A1 | 11/2007 | Bovaird et al. |
| 2009/0283189 A1 | 11/2009 | Mun |
| 2011/0180191 A1* | 7/2011 | Christenbury ..... B29D 30/0606  425/28.1 |
| 2015/0273950 A1 | 10/2015 | Martin et al. |
| 2016/0325451 A1 | 11/2016 | Wang et al. |
| 2017/0368884 A1 | 12/2017 | Furusawa |
| 2018/0236821 A1 | 8/2018 | Li |
| 2018/0250988 A1 | 9/2018 | Fontaine et al. |
| 2019/0061296 A1 | 2/2019 | Coel |
| 2019/0118583 A1 | 4/2019 | Nakamura et al. |
| 2019/0160881 A1 | 5/2019 | Chen et al. |
| 2019/0184760 A1 | 6/2019 | Cerny et al. |
| 2019/0193489 A1 | 6/2019 | Kishizoe |
| 2019/0210410 A1 | 7/2019 | Tikka et al. |
| 2019/0329510 A1 | 10/2019 | Bessac et al. |

FOREIGN PATENT DOCUMENTS

| | | |
|---|---|---|
| EP | 0691222 B2 | 8/1998 |
| EP | 1 140 527 A1 | 10/2001 |
| EP | 1 580 034 B1 | 9/2005 |
| EP | 1 926 609 A1 | 6/2008 |
| EP | 2 026 983 B1 | 8/2009 |
| EP | 3 088 212 A1 | 11/2016 |
| EP | 3 446 888 A1 | 2/2019 |
| EP | 3 645 317 A1 | 5/2020 |
| FR | 2190600 A1 | 6/1976 |
| JP | H02-267007 A | 10/1990 |
| JP | 08-040021 | 2/1996 |
| JP | 2006-312272 A | 11/2006 |
| JP | 4726106 B2 | 7/2011 |
| JP | 5962282 B2 | 8/2016 |
| KR | 100985903 | 10/2010 |
| WO | WO-2014/090437 A1 | 6/2014 |
| WO | WO-2016/054244 A1 | 4/2016 |
| WO | WO-2018/140851 A1 | 8/2018 |
| WO | WO-2019004994 A1 * | 1/2019 ............. B29D 30/68 |
| WO | WO-2022/128022 A1 | 6/2022 |
| WO | WO-2022/155670 A1 | 7/2022 |

OTHER PUBLICATIONS

Sang, K., English-translation of KR-20100002785-A by Clarivate Analytics, with full foreign patent attached; Jun. 30, 2008) (Year: 2008).*

Sang, K., English-translation of KR-20100002785-A by Clarivate Analytics, with full foreign patent attached; Jun. 30, 2008), Previously filed as non-patent literature on Feb. 27, 2024. (Year: 2008).*

Continental Tires, "Tyre Basics: Passenger Car Tyres," retrieved from https://blobs.continental-tires.com/www8/servlet/blob/693274/d2e4d4663a7c79ca81011ab47715e911/download-tire-basics-data.pdf, 32 pages (Oct. 2013).

International Search Report and Written Opinion for PCT Application No. PCT/US2022/070192, dated May 3, 2022.

International Search Report and Written Opinion for PCT Application No. PCT/US2022/070472, dated May 18, 2022, pp. 1-8.

Saf-Tee Siping & Grooving Inc., nht88-1.2 Interpretation, National Highway Traffic Safety Administration, Jan. 1, 1988.

Nokian Tyres, "Nokian Block Optimized Siping," retrieved from https://www.nokiantyres.com/innovation/innovations/nokian-block-optimized-siping/, 3 pages (accessed Sep. 29, 2021).

Razguliaev, "winter studded tire tread, sipes grooves and spikes close-up on black background. safe winter driving," Alamy Stock Photo, retrieved from https://www.alamy.com/winter-studded-tire-tread-sipes-grooves-and-spikes-close-up-on-black-background-safe-winter-driving-image327088339.html, 1 page (Sep. 15, 2019).

Performance Bodies and Parts, Tire Demon—Tire Scythe, https://www.youtube.com/watch?v=t5_RPf3wNK4 (Mar. 25, 2020).

English machine translation of non-patent literature—Bridgestone Bandag B163, 1 pg., May 2021.

* cited by examiner

US 12,122,113 B2

VERSATILE SIPE MACHINE

CROSS-REFERENCE TO RELATED PATENT APPLICATIONS

This application is the U.S. national phase of PCT Application No. PCT/US2022/070472, filed Feb. 2, 2022, which claims priority to and the benefit of U.S. Provisional Application No. 63/145,310, filed on Feb. 3, 2021, the entire contents of which are incorporated herein by reference.

BACKGROUND

The present disclosure relates generally to the field of retreading tires. Specifically, the present disclosure relates to systems and methods of forming sipes in a tire tread for retreading a tire.

SUMMARY

At least one embodiment relates to a sipe forming assembly. The sipe forming assembly includes a plunge cutting assembly, a leading roller assembly positioned upstream of the plunge cutting assembly, and a trailing roller assembly positioned downstream of the plunge cutting assembly. The plunge cutting assembly includes a blade and a linear actuator configured to actuate the blade to cut a sipe in a tire tread. The leading roller assembly includes a first leading roller and a second leading roller positionable relative to the first leading roller. The second leading roller and the first leading roller are configured to cooperate to clamp the tire tread between the first leading roller and the second leading roller. The trailing roller assembly includes a first trailing roller and a second trailing roller positionable relative to the first trailing roller. The first trailing roller and the second trailing roller are configured to cooperate to clamp the tire tread between the first trailing roller and the second trailing roller.

Another embodiment relates to a sipe forming assembly. The sipe forming assembly includes a roller assembly, a plunge cutting assembly, and a controller operably coupled to the roller assembly and the plunge cutting assembly. The roller assembly is configured to translate the tire tread along a tread plane at a feed speed. The plunge cutting assembly includes a linear actuator and a blade operably coupled to the linear actuator. The linear actuator defines an axis along which the linear actuator is configured to operate. The blade is configured to cut a sipe into the tire tread along the axis. In some embodiments, the controller is configured to actuate the linear actuator based on the feed speed.

Another embodiment relates to a method of cutting a pattern into a tire tread. The method includes feeding the tire tread through a leading roller assembly and toward a plunge cutting assembly along a tread plane; actuating the plunge cutting assembly to cut a first sipe at a first angle and a first depth using a blade, the blade operably coupled to the plunge cutting assembly; and actuating the plunge cutting assembly to cut a second sipe at a second angle and a second depth using the blade.

Another embodiment relates to a sipe forming assembly. The sipe forming assembly comprises a plunge cutting assembly, a roller assembly, and a controller. The plunge cutting assembly comprises of a blade assembly and a linear actuator. The blade assembly comprises of a plurality of blades and a plurality of rotary actuators. Each of the plurality of blades are operably coupled to a rotary actuator of the plurality of rotary actuators. Each of the rotary actuators are configured to independently rotate each of the plurality of blades relative to a lateral axis of a tire tread. The linear actuator is operably coupled to the blade assembly and configured to actuate the blade assembly such that each of the plurality of blades cut a sipe in the tire tread. The roller assembly is configured to translate the tire tread along a tread plane at a feed speed. The controller is operably coupled to roller assembly and the plunge cutting assembly and is configured to actuate each of the rotary actuator and the linear actuator based on the feed speed.

DETAILED DESCRIPTION

Figure 1:
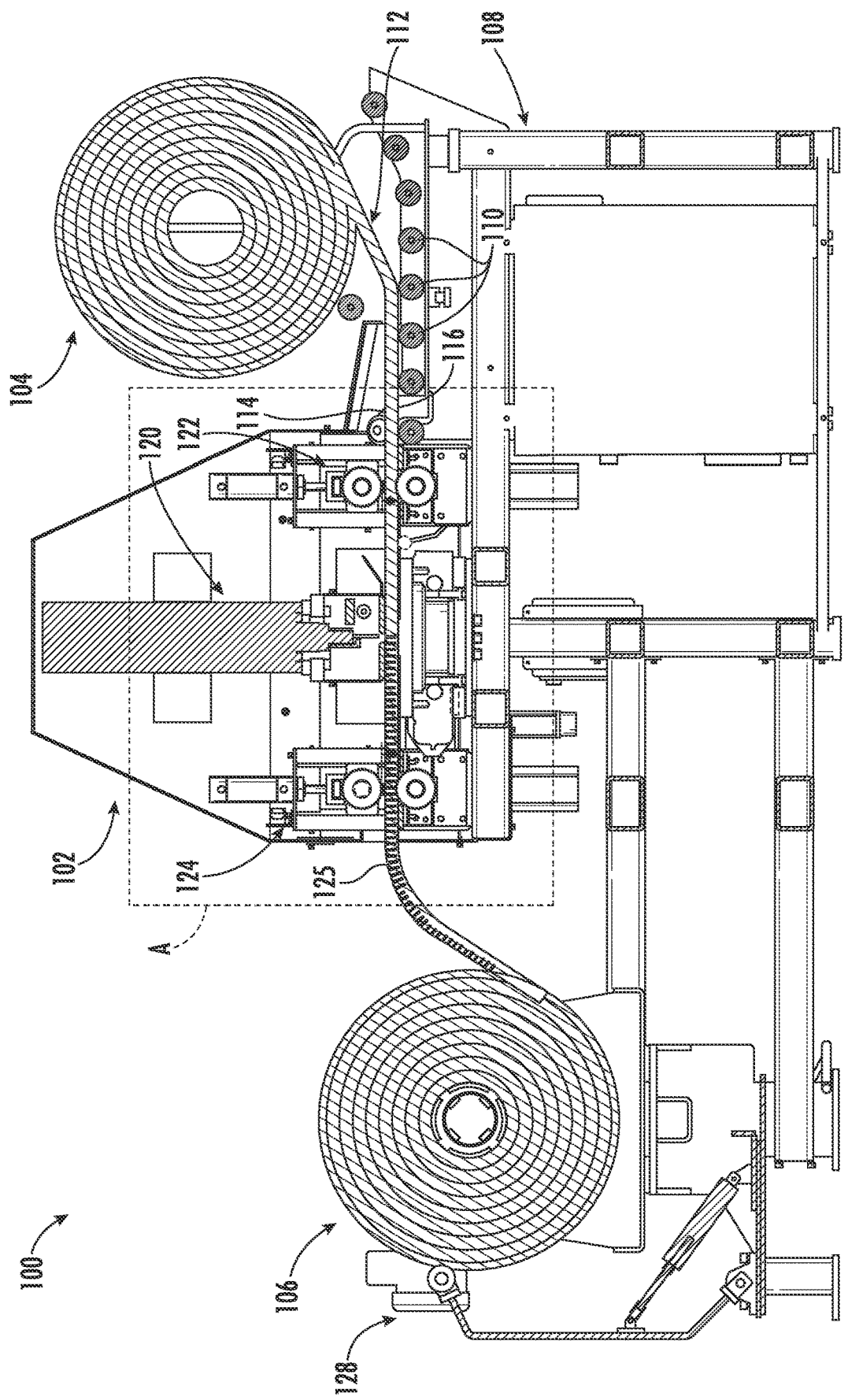
FIG. 1 is a side cross-sectional view of an assembly for forming sipes in a tire tread, according to an example embodiment.

Referring to FIG. 1, a side, cross-sectional view of an assembly 100 for cutting sipes into a tire tread is shown, according to an example embodiment. The assembly 100 includes a sipe forming assembly 102, a leading tread support roll 104 positioned upstream of the sipe forming assembly 102, and a trailing tread support roll 106 positioned downstream of the sipe forming assembly 102. Each of the sipe forming assembly 102, the leading tread support roll 104, and the trailing tread support roll 106 is supported by a support structure, shown as a chassis 108. The chassis 108 may be formed of a structurally supportive material, such as steel, metal alloys, wood, and metal beams and is configured to support the sipe forming assembly 102 at an optimal height for an operator of the sipe forming assembly 102. In some embodiments, the chassis 108 is height-adjustable such that the height of the sipe forming assembly 102 may be adjusted relative to the ground. Positioned between the leading tread support roll 104 and the sipe forming assembly 102 may be a plurality of conveyor rollers 110 that facilitate movement of a tire tread 112 from the leading tread support roll 104 to the sipe forming assembly 102.

The tire tread 112 includes a patterned surface 114 and a coupling surface 116. The patterned surface 114 (e.g., road contacting surface, etc.) may include a plurality of lugs, grooves, connecting blocks, and similar tread elements. The coupling surface 116 is configured to be coupled to a tire carcass during a tire retreading operation. In some embodiments, the coupling surface 116 is substantially flat and free from discontinuities. In some embodiments, the coupling surface 116 includes channels or grooves for removing the air from between the tire tread 112 and a tire carcass during a retreading operation. In some embodiments, the coupling surface 116 includes a fabric, roughened surface, or similar surface configured to improve the connection between the tire tread 112 and the tire carcass.

The sipe forming assembly 102 includes a plunge cutting assembly 120, a leading roller assembly 122 positioned upstream of the plunge cutting assembly 120, and a trailing roller assembly 124 positioned downstream from the plunge cutting assembly 120. During a sipe forming process, the tire tread 112 positioned on the leading tread support roll 104 is guided to the leading roller assembly 122 via the plurality of conveyor rollers 110. The leading roller assembly 122 pulls the tire tread 112 toward the plunge cutting assembly 120 which cuts a sipe 125 into the patterned surface 114 of the tire tread 112. The tire tread 112 is then pulled away from the plunge cutting assembly 120 by the trailing roller assembly 124. The tire tread 112 is rolled onto the trailing tread support roll 106 and tensioned using a roll tensioner 128. The roll tensioner 128 applies a force to the tire tread 112 on the trailing tread support roll 106 to ensure the tire tread 112 is wound at an appropriate tension.

The plunge cutting assembly 120, the leading roller assembly 122, and the trailing roller assembly 124 cooperate, in some embodiments, to space each sipe 125 equidistant from each adjacent sipe to ensure a uniform pattern of sipes is cut into the patterned surface 114. In some embodiments, each sipe 125 is spaced apart in a range between approximately 0.125 inches (in.) and 1.5 in. (e.g., 0.118 in., 0.125 in., 0.2 in., 0.3 in., 0.4 in., 0.5 in., 0.6 in., 0.7 in., 0.8 in., 0.9 in., 1.0 in., 1.25 in., 1.5 in., 1.575 in., etc.). For example, the leading roller assembly 122 and the trailing roller assembly 124 may operate at equal or similar feed speeds (e.g., feed rates) such that the tire tread 112 is pulled past the plunge cutting assembly 120 at a consistent speed. In some embodiments, the trailing roller assembly 124 operates at a slightly faster (e.g., quicker) feed speed such that the tire tread 112 is under slight tension when the plunge cutting assembly 120 cuts the sipe 125 into the patterned surface 114. In some embodiments, the plunge cutting assembly 120, the leading roller assembly 122, and the trailing roller assembly 124 are in operable communication with one another. For example, if the leading tread support roll 104 were to jam or malfunction, the torque (e.g., force) required to pull the tire tread 112 toward the plunge cutting assembly 120 may increase, causing the feed speed of the leading roller assembly 122 to decrease (e.g., get slower). As a result, the frequency at which the plunge cutting assembly 120 cuts sipes may also decrease since the plunge cutting assembly 120 is in communication with the leading roller assembly 122. When the leading tread support roll 104 is unjammed and the leading roller assembly 122 increases the feed speed, the plunge cutting assembly 120 will also increase the frequency at which the sipes are cut in the tire tread 112.

Figure 2:
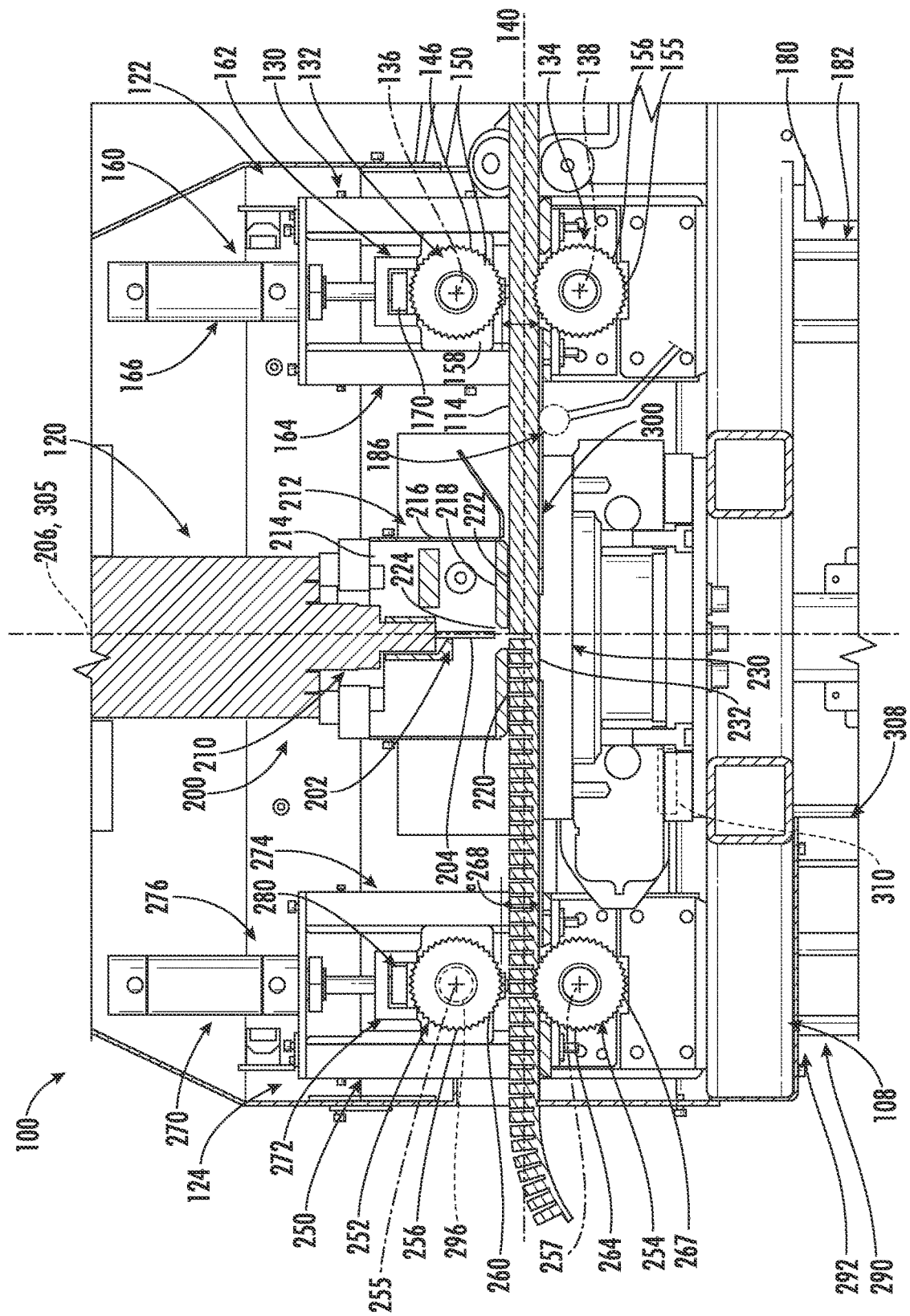
FIG. 2 is a detailed side, cross-sectional view of the assembly of FIG. 1.

Referring now to FIG. 2, a detailed cross-sectional view of the assembly 100 is shown from view window A of FIG. 1. The leading roller assembly 122 includes a leading bracket assembly 130, a first roller 132 (e.g., top roller), and a second roller 134 (e.g., bottom roller). The leading bracket assembly 130 is coupled to the chassis 108 for support. The first roller 132 is rotatably coupled to the leading bracket assembly 130 about a first roller axis 136 and the second roller 134 is rotatably coupled to the leading bracket assembly 130 about a second roller axis 138. The first roller 132 and the second roller 134 are substantially parallel to one another such that the tire tread 112 may be pulled through the leading roller assembly 122 between the first roller 132 and the second roller 134. The tire tread 112 is pulled through the leading roller assembly 122 along a tread plane 140. During a sipe forming process, the tire tread 112 travels along the tread plane 140 which extends through all of the leading roller assembly 122, the plunge cutting assembly 120, and the trailing roller assembly 124. As the tire tread 112 travels along the tread plane 140, the leading roller assembly 122 is paused while the sipe is being formed and resumes once the sipe is formed (that is, once formation is complete). In some embodiments, the tread plane 140 is substantially parallel to the ground. In some embodiments, the tread plane 140 is tilted at an angle relative to the ground. For example, the trailing roller assembly 124 may be positioned lower than the leading roller assembly 122 such that the tire tread 112 is assisted by gravity during the sipe forming process.

Figure 14:
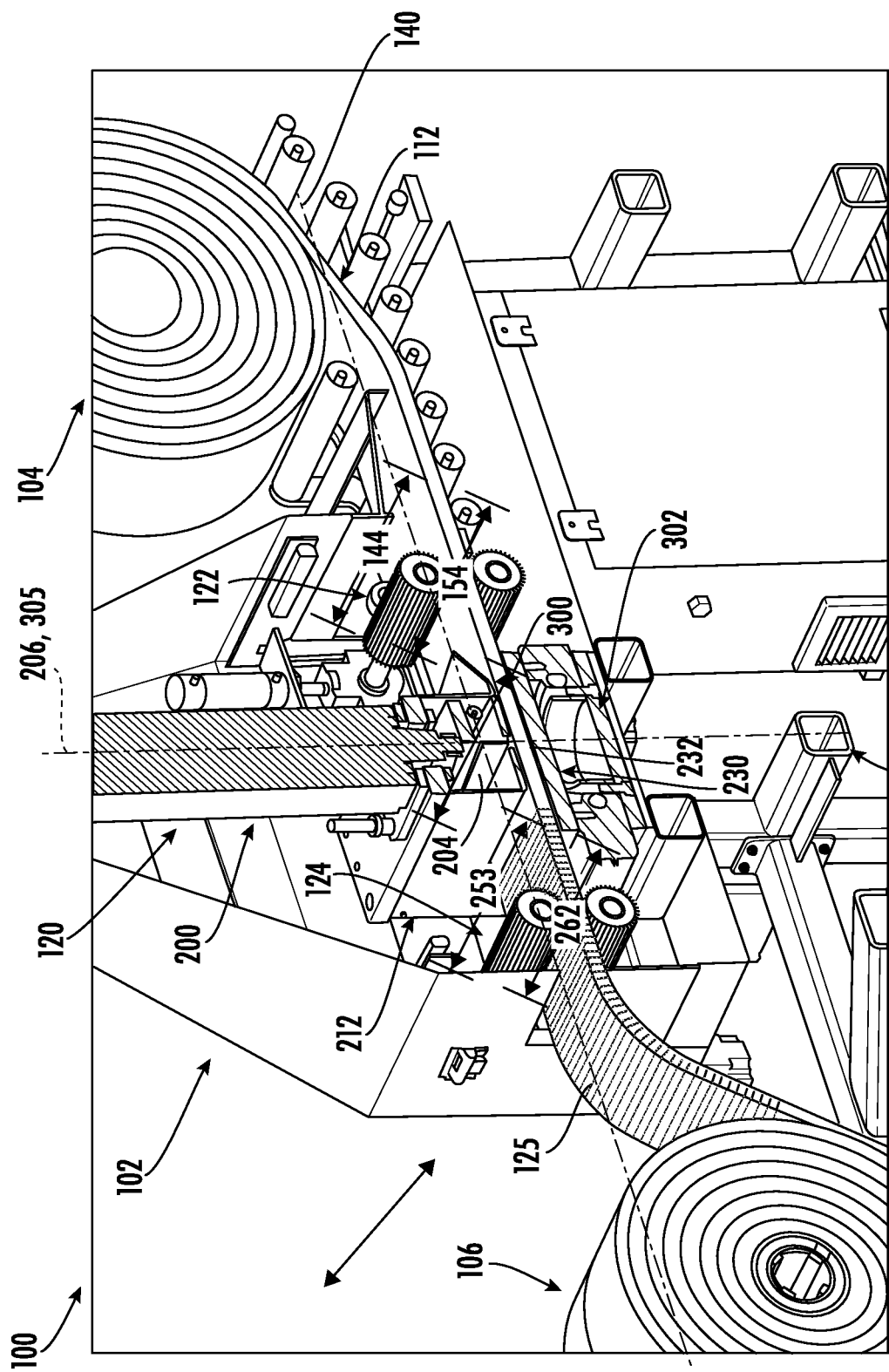
FIG. 14 is a perspective cross-sectional view of the assembly of FIG. 1.
Figure 15:
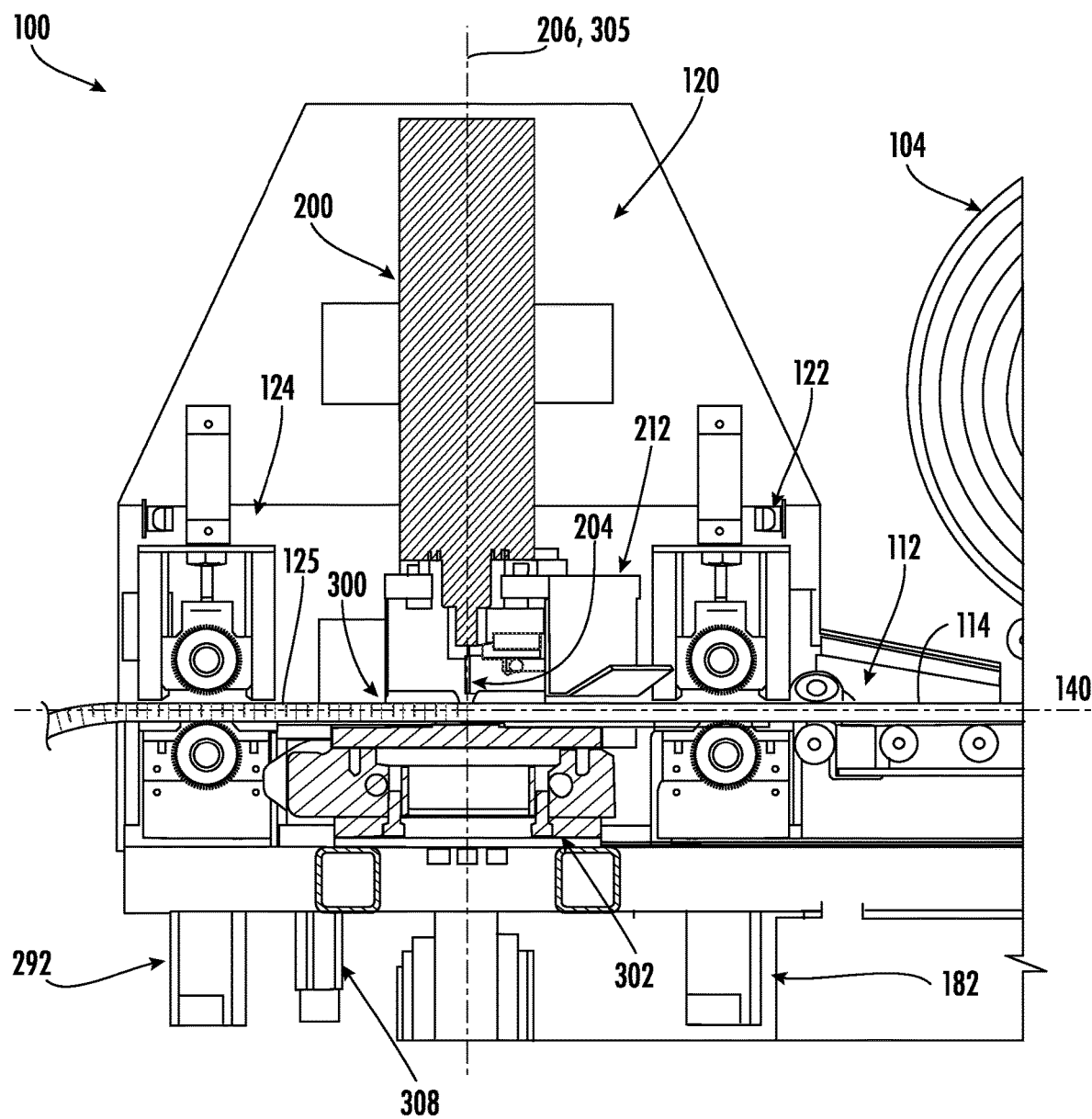
FIG. 15 is a side, cross-sectional view of the assembly of FIG. 1 having the blade rotated to a non-zero angle.

The first roller 132 defines a first roller length 144 (FIG. 14; FIG. 15) and a first roller outer surface 146. The first roller length 144 may be most any length and may depend upon the tire tread 112. For example, many tire treads are between 10-15 inches wide. Accordingly, the first roller length 144 may be between 10-15 inches, inclusive. In some embodiments, the first roller length 144 is less than 10 inches or more than 15 inches. In some embodiments, the first roller 132 is formed of a single roller that spans all the way across the tire tread 112. In some embodiments, the first roller 132 is formed of multiple rollers, each having a much smaller length than the first roller length 144. For example, the first roller 132 may be formed of 10 smaller rollers having a similar diameter but a much shorter length. The 10 smaller rollers may bite further into the tire tread 112 which may improve the grip of the first roller 132 on the tire tread 112. In some embodiments, the first roller outer surface 146 is substantially smooth and free from projections and discontinuities. In some embodiments, the first roller outer surface 146 includes a plurality of first grip features 150 that are profiled about the circumference of the first roller outer surface 146. The first grip features 150 may be teeth, cavities, or any combination thereof. The first grip features 150 extend radially from the first roller outer surface 146. In some embodiments, the first grip features 150 are formed by knurling to provide improved grip between the first roller 132 and the tire tread 112.

The second roller 134 is substantially similar to the first roller 132. Accordingly, like numbering is used to denote like parts. The second roller 134 defines a second roller length 154 (FIG. 14; FIG. 15) and a second roller outer surface 156. The second roller length 154 may be the same as the first roller length 144. In some embodiments, the second roller length 154 is longer than the first roller length 144. In some embodiments, the second roller 134 is formed of a single roller that spans all the way across the tire tread 112. In some embodiments, the second roller 134 is formed of multiple rollers, each having a much shorter length than the second roller length 154. For example, the second roller 134 may be formed of 10 smaller rollers having a similar diameter but a much smaller length. The 10 smaller rollers may bite further into the tire tread 112 which may improve the grip of the second roller 134 on the tire tread 112. In some embodiments, the second roller outer surface 156 is substantially smooth and free from projections and discontinuities. In some embodiments, the second roller outer surface 156 includes a plurality of second grip features 155 that are profiled about the circumference of the second roller outer surface 156. The second grip features 155 extend radially away from the second roller outer surface 156. The first grip features 150 may be teeth, cavities, or any combination thereof. In some embodiments, the second grip features 155 are formed by knurling to provide improved grip between the second roller 134 and the tire tread 112. The second grip features 155 may be positioned regularly about the second roller outer surface 156 such that the second grip features 155 form a pattern. In some embodiments, the second grip features 155 are randomly positioned about the second roller outer surface 156.

The first roller 132 and the second roller 134 are spaced apart by a leading roller distance 158. The leading roller distance 158 is defined as the shortest distance between the first roller outer surface 146 and the second roller outer surface 156. The leading roller distance 158 may be adjustable such that most any thickness of tire tread 112 may be positioned between the first roller 132 and the second roller 134. The first roller 132 is operably coupled to a leading roller positioning system 160 configured to move the first roller 132 relative to the second roller 134. The leading roller positioning system 160 includes a positioning block 162, guide rails 164, and a leading positioning actuator 166. An end of the first roller 132 is rotatably coupled to the positioning block 162 such that translational movement of the positioning block 162 affects translational movement of the first roller 132. The positioning block 162 is slidably coupled to the guide rails 164 that facilitate movement of the positioning block 162. The leading positioning actuator 166 is coupled to the leading bracket assembly 130 and is operably coupled to the positioning block 162. The leading positioning actuator 166 is operable to translate the positioning block 162, and thus the first roller 132, in a direction perpendicular to the tread plane 140. The leading positioning actuator 166 may be an electronic linear pull actuator or a fluid power linear actuator (e.g., pneumatic, hydraulic, etc.). During a sipe forming process, the leading positioning actuator 166 is actuated to move the first roller 132 toward the second roller 134 and clamp the tire tread 112 between the first roller 132 and the second roller 134. In some embodiments, the leading roller positioning system 160 includes a leading force sensor 170 that measures the clamping force between the first roller 132 and the second roller 134. For example, different tire treads having different tread patterns may have different operation forces that lead to desired sipe forming results. Thus, the leading force sensor 170 may be operably coupled to the leading positioning actuator 166 (e.g., such as by a feedback loop) such that the leading positioning actuator 166 applies a desired clamping force to the tire tread 112 between the first roller 132 and the second roller 134. While the leading roller positioning system 160 is described with relation to the first roller 132, it should be understood that the leading roller positioning system 160 may instead be operably coupled to the second roller 134 and configured to move the second roller 134 relative to the first roller 132 in a direction substantially perpendicular to the tread plane 140. In some embodiments, both the first roller 132 and the second roller 134 are operably movable relative to one another, such as via the leading roller positioning system 160.

The leading roller assembly 122 further includes a leading roller driving assembly 180. The leading roller driving assembly 180 is configured to rotate one of the first roller 132 and/or the second roller 134 to impart movement on the tire tread 112 toward the plunge cutting assembly 120 along the tread plane 140. As shown in FIG. 2, the second roller 134 (and not the first roller 132) is operably coupled to the leading roller driving assembly 180. In some embodiments, whichever roller engages the coupling surface 116 of the tire tread 112 is the roller that is operably coupled to the leading roller driving assembly 180. The leading roller driving assembly 180 includes a leading roller actuator 182 that is operably mounted to the second roller 134 via a drivetrain, such as a gearbox, a belt and pulley system, a chain and sprocket system, or the like. In some embodiments, both the first roller 132 and the second roller 134 are operably coupled to the leading roller driving assembly 180 and driven by the leading roller actuator 182.

The leading roller assembly 122 may also include a leading travel sensor 186 that measures the rotational position of the driven roller (e.g., the second roller 134), and thus the actual position of the tire tread 112 along the tread plane 140. In some embodiments, the leading travel sensor 186 is an encoder that is operably coupled to the second roller 134 and configured to measure a rotational position of the second roller 134. The measurement from the leading travel sensor 186 is used to determine the position of the tire tread 112 and may be used to determine when the plunge cutting assembly 120 operates to cut the sipe 125 in the tire tread 112. In some embodiments, such as when the first roller 132 is a following roller (e.g., not operably coupled to the leading roller driving assembly 180), the leading travel sensor 186 measures the rotational position of the first roller 132. In some embodiments, the leading travel sensor 186 is separate from both the first roller 132 and the second roller 134. For example, the leading travel sensor 186 may be an encoder that engages the coupling surface 116 and measures a distance travelled of the tire tread 112 along the tread plane 140.

The plunge cutting assembly 120 is positioned downstream from the leading roller assembly 122 and is configured to cut the sipe 125 into the tire tread 112. The plunge cutting assembly 120 includes a plunge fixture 200 rotatably coupled to the chassis 108 and a blade assembly 202 coupled to the plunge fixture 200 such that a rotation of the plunge fixture 200 results in an equivalent rotation of the blade assembly 202. The blade assembly 202 includes blade 204 configured to move up and down relative to the tread plane 140 and cut the sipe 125 into the patterned surface 114 of the tire tread 112. The blade 204 moves along a blade plane 206 substantially perpendicular to the tread plane 140 such that the sipe 125 is cut perpendicularly to the tread plane 140. A blade actuator 210 is operably coupled to the blade 204 and is configured to operate the blade 204 to cut the sipe 125. The blade actuator 210 may be a linear actuator, such as an electric linear actuator, a hydraulic linear actuator, a pneumatic linear actuator, and the like. The blade actuator 210 is configured to operate the blade 204 to cut many sipes per minute. In some embodiments, the blade actuator 210 operates the blade 204 to cut between 20-60 sipes per minute.

The blade 204 is disposed within a housing 212 that surrounds the blade 204. The housing 212 includes a top wall 214 (e.g., first wall), sidewalls 216 (e.g., second walls), and a bottom wall 218 (e.g., third wall). The bottom wall 218 is positioned above the tread plane 140 and is positioned substantially parallel to the tread plane 140. In some embodiments, the bottom wall 218 is configured to engage the patterned surface 114 to ensure that the tire tread 112 is substantially parallel to the tread plane 140 when the blade 204 cuts the sipe 125 into the tire tread 112. The bottom wall 218 includes a first fixture plate 220 and a second fixture plate 222 separated by a blade opening 224 that allows the blade 204 to move into and out of the housing 212. The first fixture plate 220 and the second fixture plate 222 are positioned near to the blade 204 to prevent warping, twisting, and bulging of the tire tread 112 as the blade 204 is plunged into and pulled out of the tire tread 112. For example, the blade 204 may form a sipe 125 into the tire tread 112, but the tire tread 112 may then stick to the blade 204, such as by friction from the material of the tire tread 112. Thus, the first fixture plate 220 and the second fixture plate 222 engage the patterned surface 114 to prevent the tire tread 112 from translating upward along the blade plane 206 as the blade 204 translates upward.

Positioned opposite to the blade 204 about the tread plane 140 is a cut plate 230 configured to prevent deformation of the tire tread 112 when the blade 204 cuts through the tire tread 112. The cut plate 230 defines a substantially planar cutting surface 232 formed of a rigid and resilient material, such as metal, wood, plastic, and the like. During the sipe forming process, the blade 204 is plunged into the tire tread 112 to form the sipe 125. The cut plate 230 supports the tire tread 112 so that the tire tread 112 remains perpendicular to the blade 204 and remains within the tread plane 140 while the blade 204 is plunged into and removed from the tire tread 112. In some embodiments, the blade 204 cuts all the way through the tire tread 112 and the cutting surface 232 is configured to receive the blade 204 without dulling the blade. For example, the cutting surface 232 may be formed of a hard rubber or end grain wood such that the blade 204 may repeatedly contact the cutting surface 232 without quickly becoming dull. In some embodiments, the cutting surface 232 does not come into contact with the blade 204 and the cutting surface 232 is not resistant to cutting and is not configured to receive the blade 204. In other words, the cutting surface 232 may be formed of ceramic, metal, plastic, stone, wood, resin, or similar material. The cutting surface 232 defines a width (into the page; FIG. 2) that is greater than a blade width 234 (into the page; FIG. 2). The cutting surface 232 has a width approximately the width of the tire tread 112. In some embodiments, the cutting surface 232 is removable such that a different cut surface may be coupled to the cut plate 230 and in operable communication with the blade 204. For example, the cutting surface 232 may become recessed or worn out due to the high pressures needed for cutting the sipe 125 in combination with the feed rate of the tire tread 112. As the cutting surface 232 wears down, the sipes 125 formed during the sipe forming process may be undesirable (e.g., too shallow near the center of the tire tread 112, too deep near the edges of the tire tread 112, not straight, etc.). In some embodiments, the cutting surface 232 may be replaced with a new cutting surface having a different length or width to accommodate tire treads of varying widths and lengths.

Figure 3:
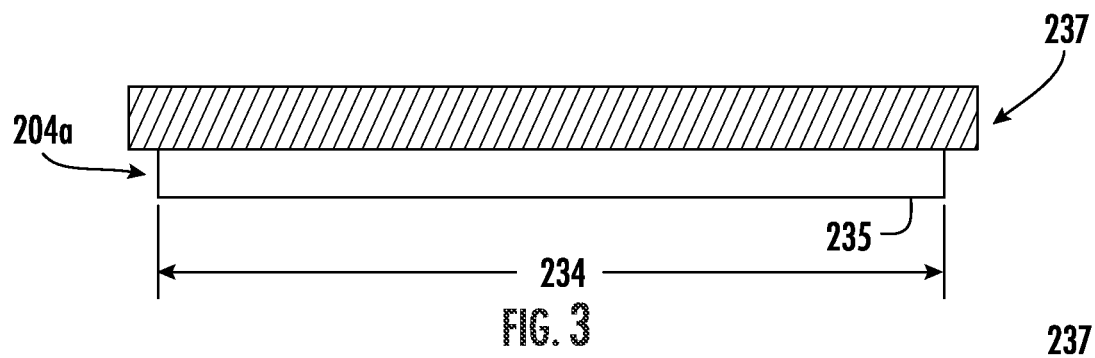
FIG. 3 is a front view of a blade for use with the assembly, according to an example embodiment.

The blade 204 is replaceable such that multiple types of blades may be operably coupled to the blade assembly 202. For example, referring to FIGS. 3-13B, the blade 204 may be formed having different edge characteristics depending on the application of the tire tread 112. For example, FIG. 3 is a "standard" blade 204a, shown coupled to the blade assembly 202 in FIG. 2. The blade 204a includes a blade edge 235 that extends parallel to the tread plane 140 when the blade 204a is coupled to the blade assembly 202. The blade 204a is configured to cut the sipe 125 into the tire tread 112, the sipe 125 having the same depth along the length of the sipe 125.

The blade assembly 202 further includes a blade coupling member 237 coupled to the blade 204 and configured to be removably coupled with the plunge fixture 200. The blade coupling member 237 may be formed of plastic, metal, wood, a polymer, or a similar material. In some embodiments, the blade coupling member 237 is formed separately from the blade 204 and is later coupled to the blade 204. The blade coupling member 237 may be coupled to the plunge fixture 200 using fasteners, latches, clamps, or a similar coupling system.

Figure 4:
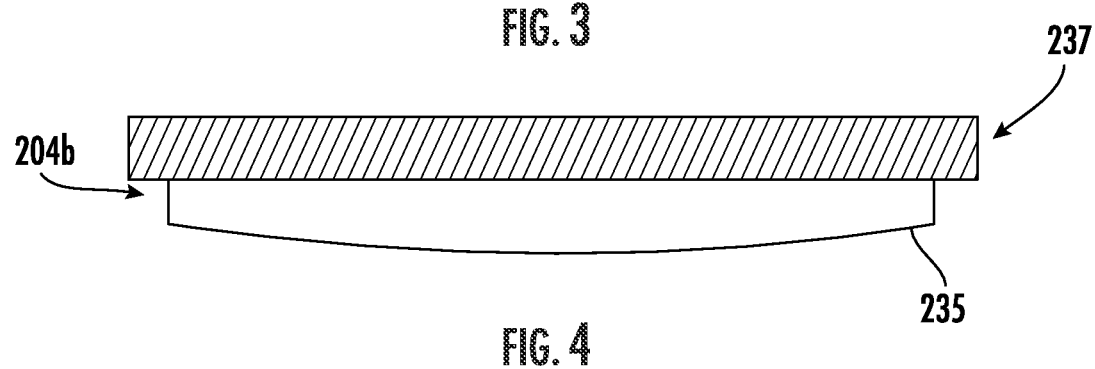
FIG. 4 is a front view of a blade for use with the assembly, according to another example embodiment.

Referring to FIG. 4, a blade 204b is shown, according to an example embodiment. The blade 204b is similar to the blade 204a. A difference between the blade 204b and the blade 204a is that the blade edge 235 of the blade 204b defines a convex profile configured to cut a sipe having a greater depth proximate to the middle of the tire tread 112 than to the edges of the tire tread 112. While an example convex edge is shown, it should be understood that the blade edge 235 may include varying degrees (e.g., radius of convexity) such that the sipe 125 may be cut at different depths and patterns.

Figure 5:
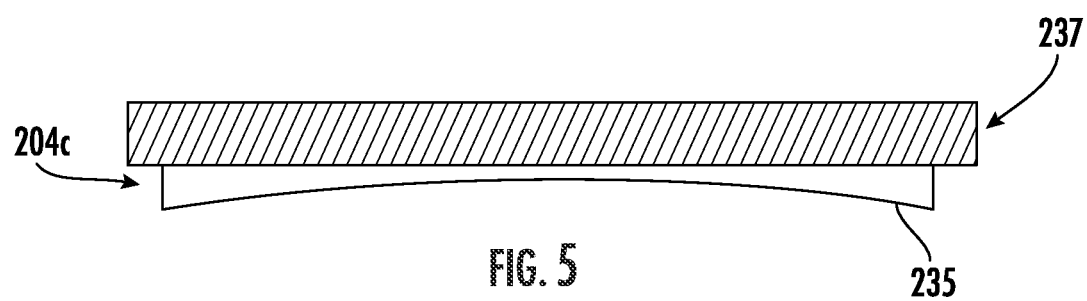
FIG. 5 is a front view of a blade for use with the assembly, according to yet another example embodiment.

Referring to FIG. 5, a blade 204c is shown, according to another example embodiment. The blade 204c is similar to the blade 204a. A difference between the blade 204c and the blade 204a is that the blade 204c defines a concave blade edge 235. The concave blade edge 235 is configured to cut a sipe having a greater depth proximate to the edges of the tire tread 112 than to the middle of the tire tread 112. While an exemplary blade edge 235 is shown, it should be understood that the concave blade edge 235 may be defined by most any edge radius.

Figure 6:
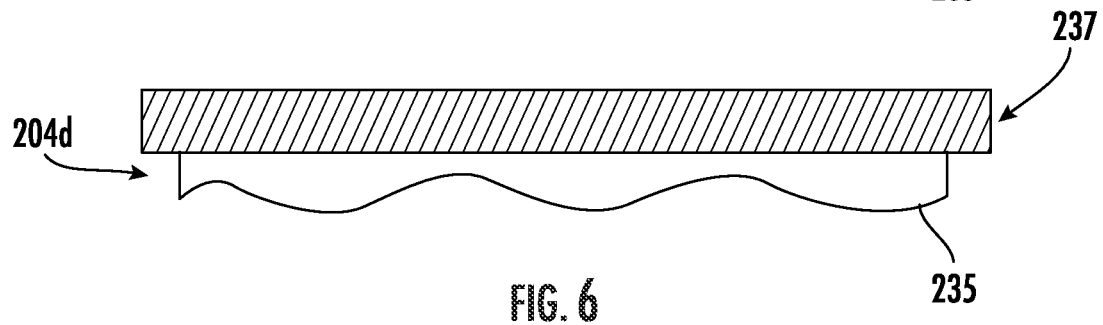
FIG. 6 is a front view of a blade for use with the assembly, according to yet another example embodiment.

Referring to FIG. 6, a blade 204d is shown, according to yet another example embodiment. The blade 204d is similar to the blade 204a. A difference between the blade 204d and the blade 204a is that the blade 204d defines a blade edge 235 having a sinusoidal profile. The blade edge 235 of the blade 204d may cut a sipe in the tire tread 112 having a depth that varies cyclically between the two edges of the tire tread 112. For example, the blade edge 235 may define valleys and hills that cut varying depths into the tire tread 112.

Figure 7:
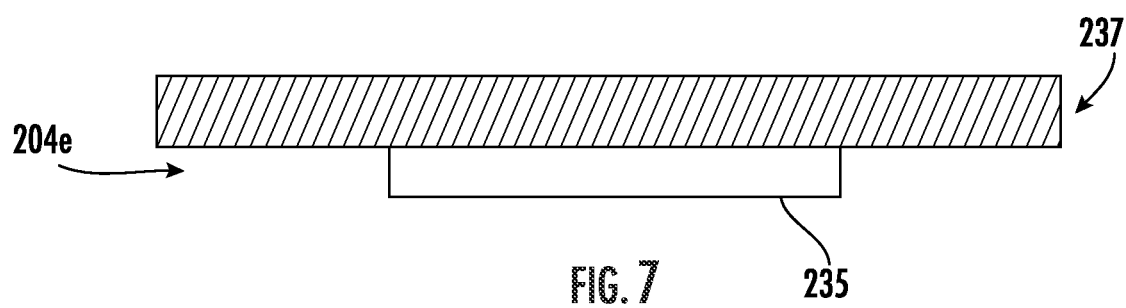
FIG. 7 is a front view of a blade for use with the assembly, according to yet another example embodiment.

Referring to FIG. 7, a blade 204e is shown, according to yet another example embodiment. The blade 204e is similar to the blade 204a. A difference between the blade 204e and the blade 204a is that the blade 204e defines a smaller width, which is a width less than the width of the tire tread 112. The blade 204e is configured to cut the sipe 125 such that a portion of the tire tread 112 remains uncut between the end of the sipe 125 and the edge of the tire tread 112. In some embodiments, forming the sipe 125 proximate to the center of the tire tread 112 such that the sipe does not extend to the edges of the tire tread 112 may improve the wear of the tire tread 112.

Figure 8:
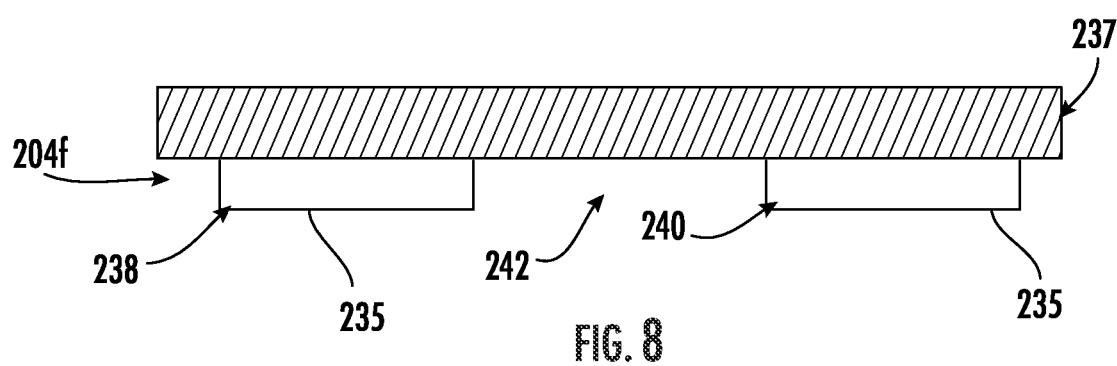
FIG. 8 is a front view of a blade for use with the assembly, according to yet another example embodiment.

Referring to FIG. 8, a blade 204f is shown, according to yet another example embodiment. The blade 204f is similar to the blade 204a. A difference between the blade 204f and the blade 204f is that the blade 204f is formed of a first blade edge characteristic 238 and a second blade edge characteristic 240 separated by a gap 242. When the blade 204f is coupled with the plunge fixture 200, the gap 242 may be positioned proximate to the center of the tire tread 112 such that the sipe 125 does not extend through the center of the tire tread 112. The first blade edge characteristic 238 and the second blade edge characteristic 240 are configured to form a sipe that has an end positioned at the edge of the tire tread 112 and an end positioned between the edge of the tire tread 112 and the center of the tire tread 112. In some embodiments, the first blade edge characteristic 238 is sized and positioned such that the sipe 125 is formed entirely within the tire tread 112 between the edge of the tire tread 112 and the center of the tire tread 112.

Figure 9:
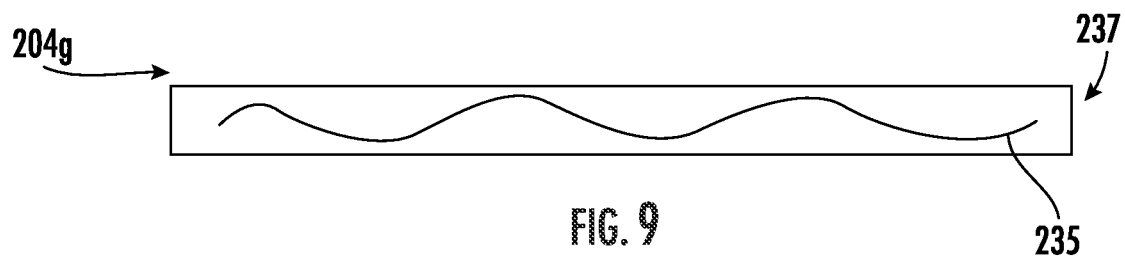
FIG. 9 is a bottom view of a blade for use with the assembly, according to yet another example embodiment.
Figure 10:
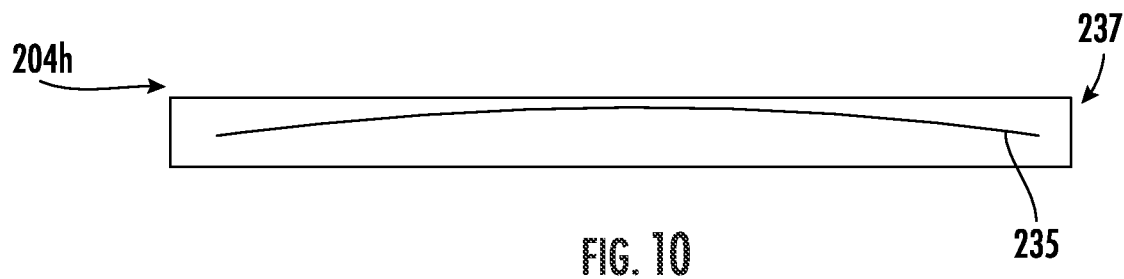
FIG. 10 is a bottom view of a blade for use with the assembly, according to yet another example embodiment.

Referring to FIG. 9, a bottom view of a blade 204g is shown, according to yet another example embodiment. The blade 204g is similar to the blade 204a. A difference between the blade 204g and the blade 204a is that the blade 204g has a curved blade edge 235 configured to cut a wavy or curved sipe. While the blade edge 235 is shown as having a sinusoidal profile, it should be understood that other edge profiles are possible. For example, a blade 204h shown in FIG. 10 has an arched edge profile configured to cut a sipe 125 having a large radius of curvature.

Figure 11A:
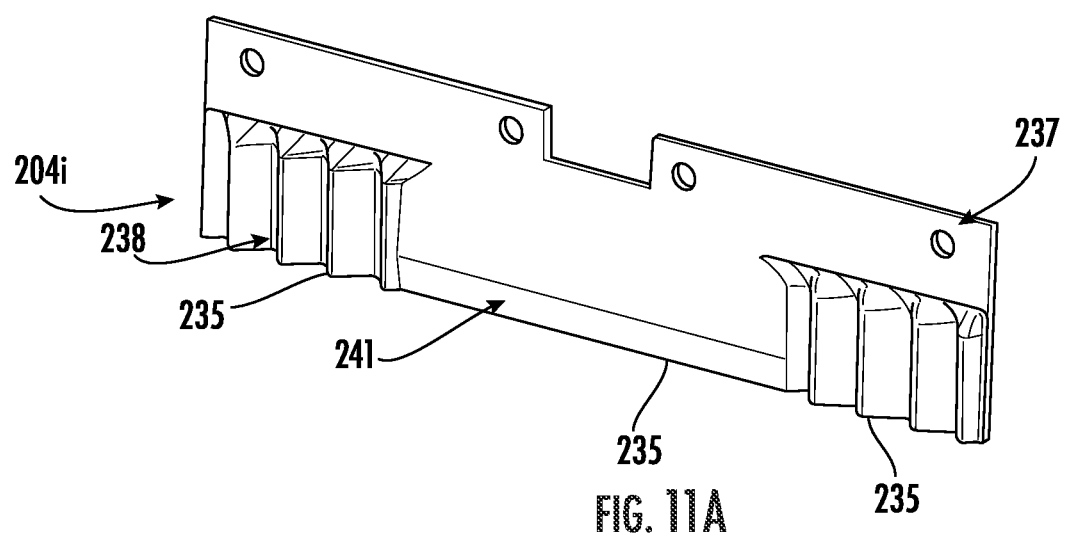
FIG. 11A is perspective view of a blade for use with the assembly, according to yet another example embodiment.
Figure 11B:
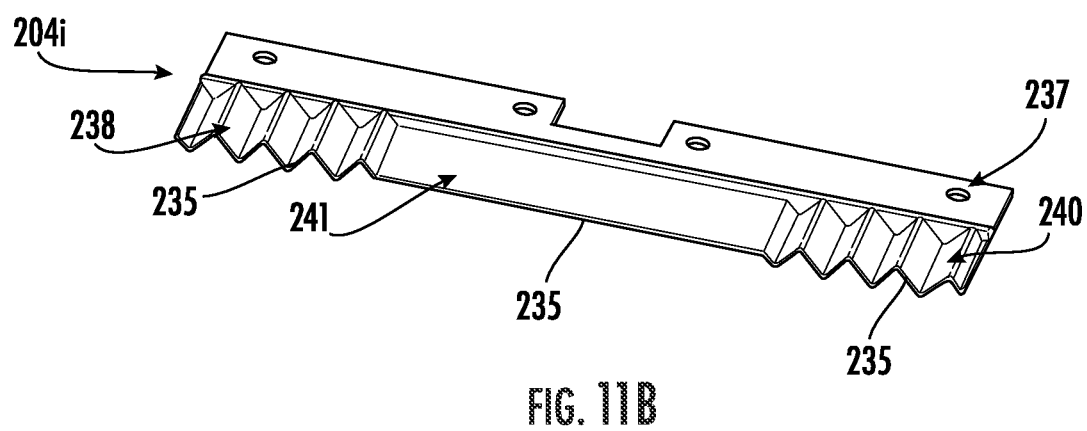
FIG. 11B is a perspective view of the blade of FIG. 11A.

Referring to FIGS. 11A and 11B, a blade 204i is shown, according to yet another example embodiment. The blade 204i is similar in some aspects to the blade 204a. However, unlike blade 204a, blade 204i is defined at least in part by a first blade edge characteristic 238, a second blade edge characteristic 240, and a third blade edge characteristic 241. The first blade edge characteristic 238 and the second blade edge characteristic 240 of the blade 204i define a blade edge 235 having a zig-zag profile. The third blade edge characteristic 241 of blade 204i is positioned between the first blade edge characteristic 238 and second blade edge characteristic 240 and has a linear profile. In some embodiments, the first blade edge characteristic 238 and the second blade edge characteristic 240 have a linear profile and the third blade edge characteristic 241 has a zig-zag profile (e.g., a sawtooth profile). When the blade 204i is coupled with the plunge fixture, the third blade edge characteristic 241 may be positioned proximate to the tire tread 112 such that the sipe 125 extends through the center of the tire tread 112. The first blade edge characteristic 238 and the second blade edge characteristic 240 are configured to form a sipe that has an end positioned at the edge of the tire tread 112 and an end positioned between the edge of the tire tread 112 and the center of the tire tread. The third blade edge characteristic 241 is configured to form a sipe that extends along the center of the tire tread between the sipe formed by the first blade edge characteristic 238 and the sipe formed by the second blade edge characteristic 240. By having a sipe which has 2 or more profiles forming the sipe 125, the tread durability and tread traction of the tire tread 112 may be enhanced.

Figure 12A:
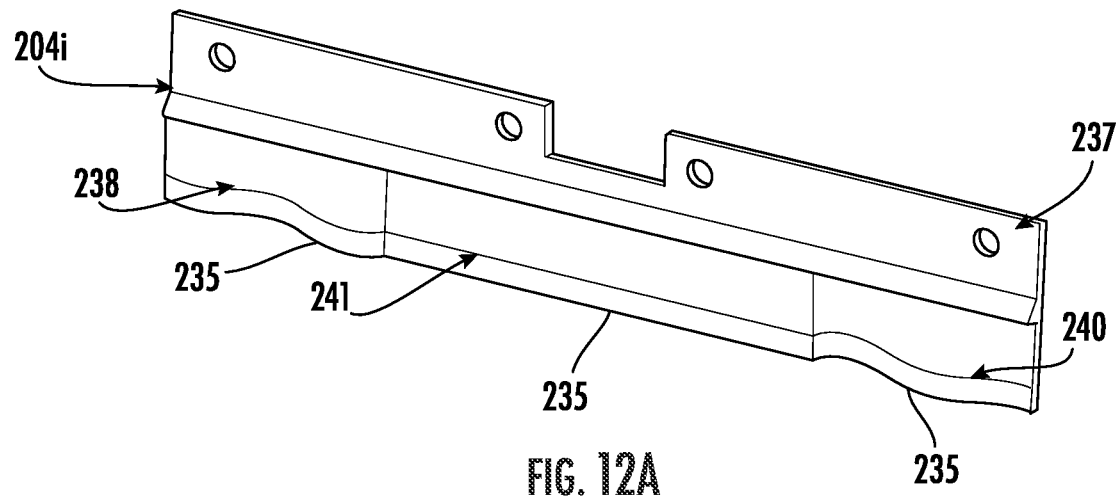
FIG. 12A is perspective view of a blade for use with the assembly, according to yet another example embodiment.
Figure 12B:
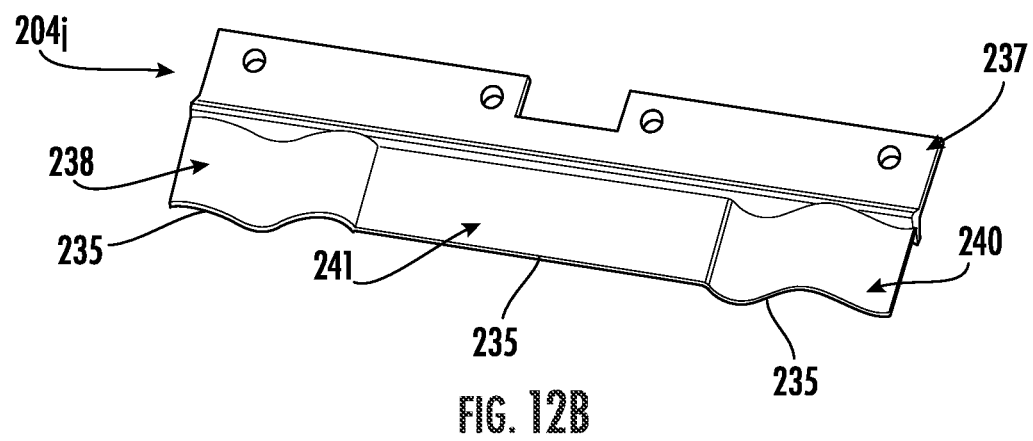
FIG. 12B is a perspective view of the blade of FIG. 12A.

Referring to FIGS. 12A and 12B a blade 204j is shown, according to yet another example embodiment. The blade 204j is similar to the blade 204a in some aspects; however, unlike blade 204a, blade 204j is defined at least in part by a first blade edge characteristic 238, a second blade edge characteristic 240, and a third blade edge characteristic 241. The first blade edge characteristic 238 and the second blade edge characteristic 240 of the blade 204j define a blade edge 235 having a sinusoidal profile. The third blade edge characteristic 241 of blade 204j is positioned between the first blade edge characteristic 238 and second blade edge characteristic 240 and has a linear profile. In some embodiments, the first blade edge characteristic 238 and the second blade edge characteristic 240 have a linear profile and the third blade edge characteristic 241 has a sinusoidal (oscillating) profile. When the blade 204i is coupled with the plunge fixture, the third blade edge characteristic 241 may be positioned proximate to the tire tread 112 such that the sipe 125 extends through the center of the tire tread 112. The first blade edge characteristic 238 and the second blade edge characteristic 240 are configured to form a sipe that has an end positioned at the edge of the tire tread 112 and an end positioned between the edge of the tire tread 112 and the 112 and the center of the tire tread. The third blade edge characteristic 241 is configured to form a sipe that extends along the center of the tire tread between the sipe formed by the first blade edge characteristic 238 and the sipe formed by the second blade edge characteristic 240.

Figure 13A:
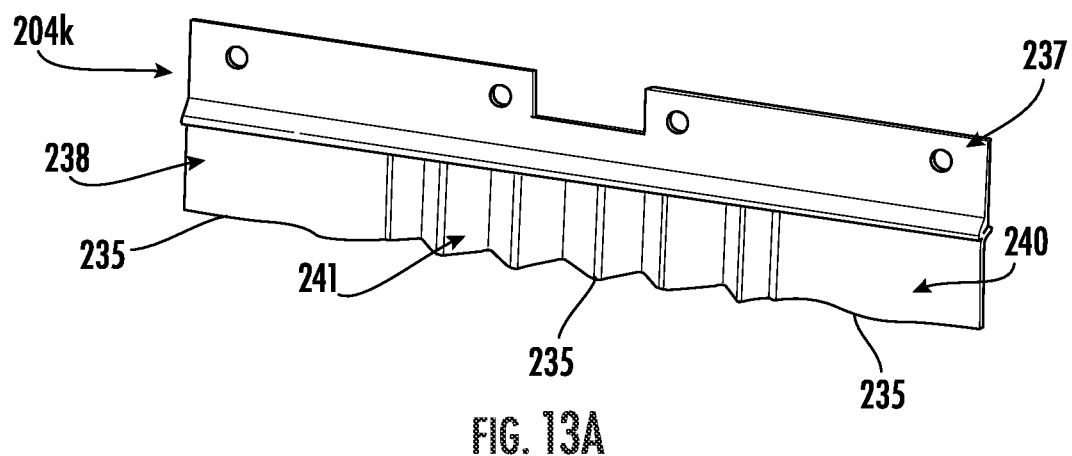
FIG. 13A is perspective view of a blade for use with the assembly, according to yet another example embodiment.
Figure 13B:
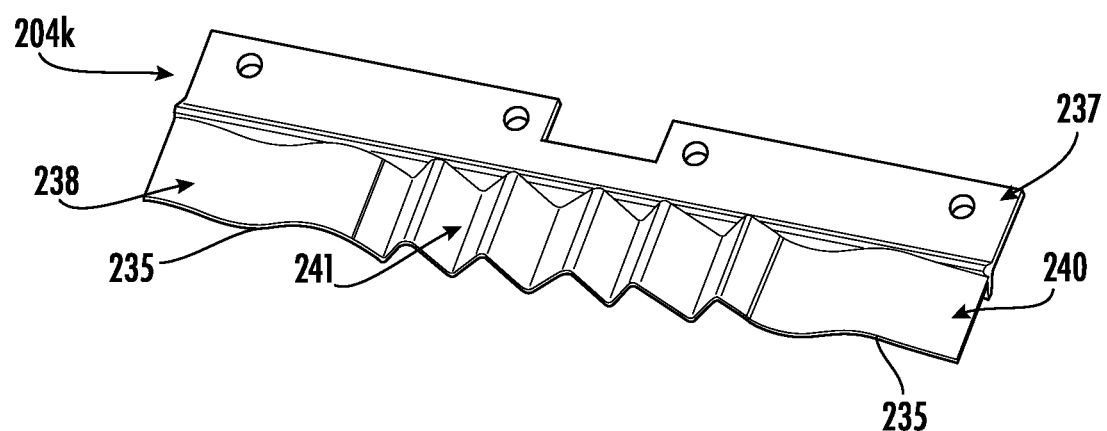
FIG. 13B is a perspective view of the blade of FIG. 13A.

Referring to FIGS. 13A and 13B, a blade 204k is shown, according to yet another example embodiment. The blade 204k is similar to the blade 204a; however, a difference between the blade 204k and the blade 204a is that blade 204k is defined at least in part by a first blade edge characteristic 238, a second blade edge characteristic 240, and a third blade edge characteristic 241. The first blade edge characteristic 238 and the second blade edge characteristic 240 of the blade 204k define a blade edge 235 having a sinusoidal profile. The third blade edge characteristic 241 of blade 204i is positioned between the first blade edge characteristic 238 and second blade edge characteristic 240 and has a zig-zag profile. In some embodiments, the first blade edge characteristic 238 and the second blade edge characteristic 240 have a zig-zag profile and the third blade edge characteristic 241 has a sinusoidal profile. When the blade 204i is coupled with the plunge fixture, the third blade edge characteristic 241 may be positioned proximate to the tire tread 112 such that the sipe 125 extends through the center of the tire tread 112. The first blade edge characteristic 238 and the second blade edge characteristic 240 are configured to form a sipe that has an end positioned at the edge of the tire tread 112 and an end positioned between the edge of the tire tread 112 and the center of the tire tread. The third blade edge characteristic 241 is configured to form a sipe that extends along the center of the tire tread and connects the sipe formed by the first blade edge characteristic 238 and the sipe formed by the second blade edge characteristic 240.

Referring again to FIG. 2, the trailing roller assembly 124 is positioned downstream of the plunge cutting assembly 120. The trailing roller assembly 124 includes a trailing bracket assembly 250, a first roller 252 (e.g., top roller) and a second roller 254 (e.g., bottom roller). The trailing bracket assembly 250 is coupled to the chassis 108 for support. The first roller 252 is rotatably coupled to the trailing bracket assembly 250 about a first roller axis 255 and the second roller 254 is rotatably coupled to the trailing bracket assembly 250 about a second roller axis 257. The first roller 252 and the second roller 254 are substantially parallel to one another such that the tire tread 112 may be pulled through the trailing roller assembly 124 between the first roller 252 and the second roller 254 once the sipe 125 is formed in the tire tread 112. The tire tread 112 is pulled through the trailing roller assembly 124 along the tread plane 140.

The first roller 252 defines a first roller length 253 (FIG. 14; FIG. 15) and a first roller outer surface 256. The first roller length 253 may be similar to the first roller length 144 (FIG. 14; FIG. 15). The first roller length 253 may be most any length and may depend upon the tire tread 112. For example, many tire treads are between approximately 10 to approximately 15 inches wide. Accordingly, the first roller length 253 may be between approximately 10 to approximately 15 inches, inclusive. In some embodiments, the first roller length 253 is equal to the first roller length 144. In some embodiments, the first roller 252 is formed of a single roller that spans all the way across the tire tread 112. In some embodiments, the first roller 252 is formed of multiple rollers, each having a much smaller length than the first roller length 253. For example, the first roller 252 may be formed of 10 smaller rollers having a similar diameter but a much smaller length. The 10 smaller rollers may bite further into the tire tread 112 which may improve the grip of the first roller 252 on the tire tread 112. In some embodiments, the first roller outer surface 256 is substantially smooth and free from projections and discontinuities. In some embodiments, the first roller outer surface 256 includes a plurality of first grip features 260 that are profiled about the circumference of the first roller outer surface 256. The first grip features 260 extend radially from the first roller outer surface 256. The first grip features 260 may be teeth, cavities, or any combination thereof. In some embodiments, the first grip features 260 are formed by knurling to provide improved grip between the first roller 252 and the tire tread 112. The first grip features 260 may be positioned regularly about the first roller outer surface 256 such that the first grip features 260 form a pattern. In some embodiments, the first grip features 260 are randomly positioned about the first roller outer surface 256.

Figure 16:
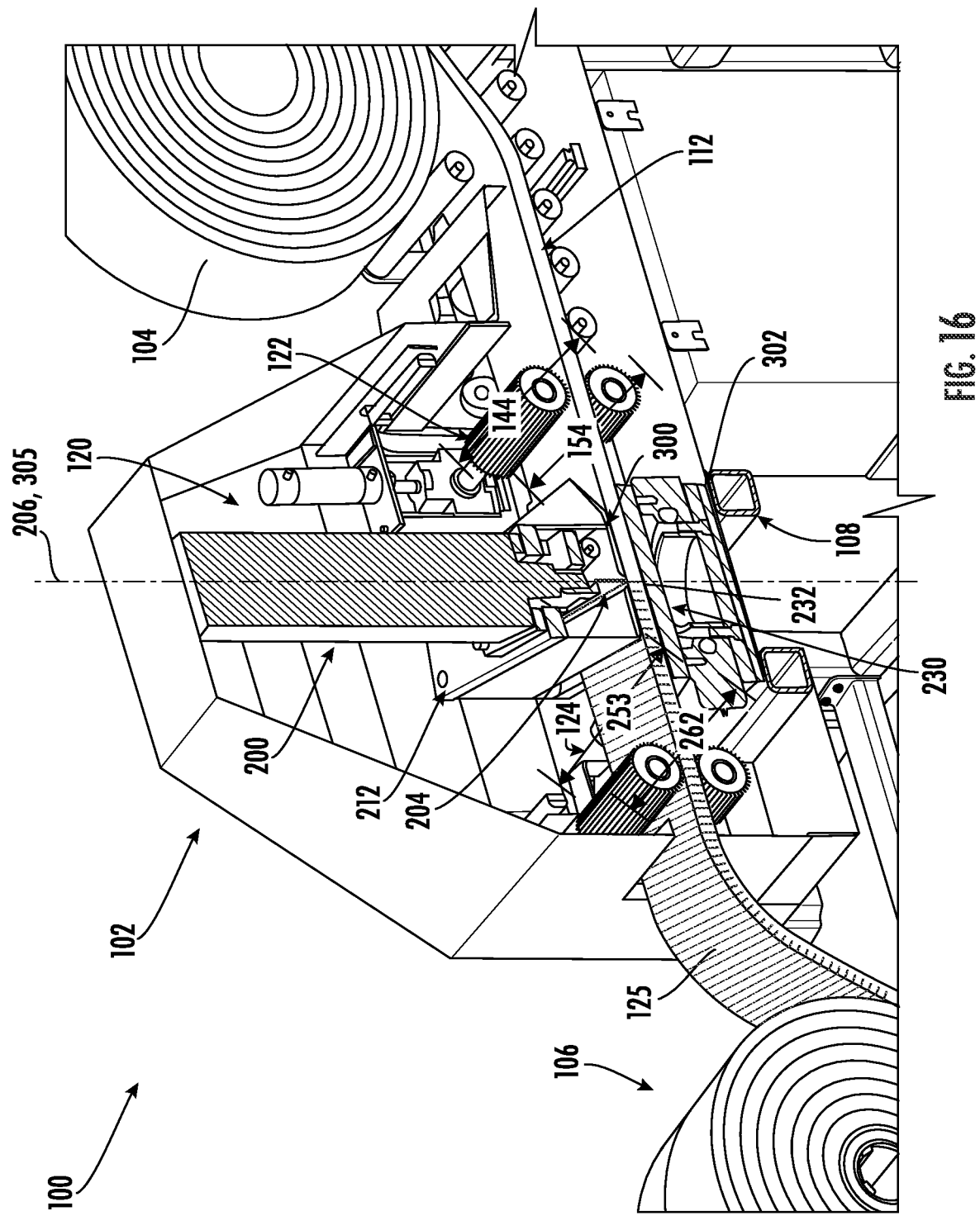
FIG. 16 is a perspective cross-sectional view of the assembly of FIG. 15.

The second roller 254 is substantially similar to the first roller 252. Accordingly, like numbering is used to denote like parts. The second roller 254 defines a second roller length 262 (FIG. 14; FIG. 16) and a second roller outer surface 264. The second roller length 262 may be similar to the second roller length 154. In some embodiments, the second roller length 262 is the same as the first roller length 253. In some embodiments, the second roller length 262 is longer than the first roller length 253. In some embodiments, the second roller 254 is formed of a single roller that spans all the way across the tire tread 112. In some embodiments, the second roller 254 is formed of multiple rollers, each having a much smaller length than the second roller length 262. In some embodiments, the second roller outer surface 264 is substantially smooth and free from projections and discontinuities. In some embodiments, the second roller outer surface 264 includes a plurality of second grip features 267 that are profiled about the circumference of the second roller outer surface 264. The second grip features 267 extend radially from the second roller outer surface 264. The second grip features 267 may be teeth, cavities, or any combination thereof. In some embodiments, the second grip features 267 are formed by knurling to provide improved grip between the second roller 254 and the tire tread 112. The second grip features 267 may be positioned regularly about the second roller outer surface 264 such that the second grip features 267 form a pattern. In some embodiments, the second grip features 267 are randomly positioned about the second roller outer surface 264.

The first roller 252 and the second roller 254 are spaced apart by a trailing roller distance 268. The trailing roller distance 268 is defined as the shortest distance between the first roller outer surface 256 and the second roller outer surface 264. The trailing roller distance 268 may be adjustable such that most any thickness of tire tread 112 may be positioned between the first roller 252 and the second roller 254. The first roller 252 is operably coupled to a trailing roller positioning system 270 configured to move the first roller 252 relative to the second roller 254. The trailing roller positioning system 270 includes a positioning block 272, guide rails 274, and a trailing positioning actuator 276. An end of the first roller 252 is rotatably coupled to the positioning block 272 such that translational movement of the positioning block 272 affects translational movement of the first roller 252. The positioning block 272 is slidably coupled to the guide rails 274 which facilitate movement of the positioning block 272. The trailing positioning actuator 276 is coupled to the trailing bracket assembly 250 and is operably coupled to the positioning block 272. The trailing positioning actuator 276 is operable to translate the positioning block 272, and thus the first roller 252, along the guide rails 274 in a direction perpendicular to the tread plane 140. The trailing positioning actuator 276 may be an electronic linear pull actuator (e.g., ball screw, lead screw, etc.) or a fluid power linear actuator (e.g., pneumatic, hydraulic, etc.). During a sipe forming process after the sipe has been formed, the trailing positioning actuator 276 is actuated to move the first roller 252 toward the second roller 254 and clamp the tire tread 112 between the first roller 252 and the second roller 134. While the sipe is being formed, the first roller 252 and the second roller 254 does not move. In some embodiments, the trailing roller positioning system 270 includes a trailing force sensor 280 that measures the force applied by the first roller 252 to the tire tread 112. For example, different tire treads having different tread patterns may have different operation forces that lead to desired sipe forming results. Thus, the trailing force sensor 280 may be operably coupled to the trailing positioning actuator 276 (e.g., such as by a feedback loop) such that the trailing positioning actuator 276 applies a desired clamping force to the tire tread 112 between the first roller 252 and the second roller 254. While the trailing roller positioning system 270 is described with relation to the first roller 252, it should be understood that the trailing roller positioning system 270 may instead be operably coupled to the second roller 254 and configured to move the second roller 254 relative to the first roller 252 in a direction substantially perpendicular to the tread plane 140. In some embodiments, both the first roller 252 and the second roller 254 are operably movable relative to one another, such as by the trailing roller positioning system 270.

The trailing roller assembly 124 further includes a roller driving assembly 290 configured to rotate one of the first roller 252 or the second roller 254 to impart movement on the tire tread 112 away from the plunge cutting assembly 120 along the tread plane 140 and toward the leading tread support roll 104. As shown in FIG. 2, the second roller 254 (and not the first roller 252) is operably coupled to the roller driving assembly 290. In some embodiments, whichever roller engages the coupling surface 116 of the tire tread 112 is the roller that is operably coupled to and driven by the roller driving assembly 290. The roller driving assembly 290 includes a trailing roller actuator 292 that is operably mounted to the second roller 254 via a drivetrain, such as a gearbox, a belt and pulley system, a chain and sprocket system, or the like. In some embodiments, both the first roller 252 and the second roller 254 are operably coupled to the roller driving assembly 290.

The trailing roller assembly 124 may also include a trailing travel sensor 296 that measures the rotational position of the driven roller (e.g., the second roller 254), and thus the actual position of the tire tread 112 along the tread plane 140. In some embodiments, the trailing travel sensor 296 is an encoder that is operably coupled to the second roller 254 and configured to measure a rotational position of the second roller 254. The measurement from the trailing travel sensor 296 is used to determine the position of the tire tread 112 and used to determine when the plunge cutting assembly 120 should cut the sipe 125 in the tire tread 112. In some embodiments, such as when the first roller 252 is a following roller (e.g., not operably coupled to the roller driving assembly 290), the trailing travel sensor 296 measures the rotational position of the first roller 252. In some embodiments, the trailing travel sensor 296 is separate from both the first roller 252 and the second roller 254. For example, the trailing travel sensor 296 may be an encoder that engages the coupling surface 116 and measures a distance travelled of the tire tread 112 along the tread plane 140. The trailing travel sensor 296 and the leading travel sensor 186 may cooperate to determine the feed speed and the position of the tire tread 112. For example, slip between the driven roller and the tire tread 112 may result in inconsistent sipe formation, and the cooperation of the leading travel sensor 186 and the trailing travel sensor 296 may alert the operator that there has been slip.

Turning now to FIG. 14, a perspective cross-sectional view of the sipe forming assembly 102 is shown. The plunge fixture 200 and the housing 212 are coupled to the cut plate 230 such that movement of the cut plate 230 translates to movement of the plunge fixture 200. The cut plate 230 and the plunge fixture 200 cooperate to define a channel 300 through which the tread plane 140 extends. The cut plate 230 is coupled to a rotation assembly 302 configured to rotate the cut plate 230 and the plunge fixture 200 relative to the tread plane 140 about an axis, shown as a central axis 305. The central axis 305 is perpendicular to the tread plane 140. In some embodiments, the central axis 305 lies within the blade plane 206.

The rotation assembly 302 is coupled to the chassis 108 and is operably coupled to a rotation assembly actuator 308 (FIG. 2). The rotation assembly actuator 308 is configured to rotate the rotation assembly 302 such that the plunge fixture 200 rotates relative to the tread plane 140 about the central axis 305. The rotation assembly 302 further includes a rotation assembly sensor 310 (FIG. 2), such as an encoder, that measures the angle of the blade 204 relative to the width of the tire tread 112. For example, as shown in FIG. 2, the blade 204 is at 0° (zero rotational degrees) relative to the tire tread 112 such that the sipe 125 extends perpendicularly across the width of the tire tread 112.

As shown in FIGS. 15 and 16, an operator may operate the rotation assembly actuator 308 to rotate the rotation assembly 302 such that the blade 204 is positioned at a non-zero angle relative to the width of the tire tread 112. For example, the rotation assembly 302 may rotate the plunge fixture 200 and the housing 212 such that the blade 204 is positioned to cut the sipe 125 at an angle of 90°, or parallel to the feed direction of the tire tread 112. In some embodiments, the rotation assembly actuator 308 may be operated to rotated the rotation assembly 302 such that the blade 204 is positioned at a non-zero angle in a range between −90° and 90° with respect to the feed direction of the tire tread 112 (e.g., −90°, −75°, −60°, −45°, −30°, −15°, 0°, 15°, 30°, 45°, 75°, 90°, etc.). In some embodiments, the rotation assembly 302 is positioned above the tread plane 140 (e.g., on the same side of the tread plane 140 as the plunge fixture 200) such that the width and length of the channel 300 does not limit the rotation of the plunge fixture 200. The rotation assembly 302 may rotate the plunge fixture 200 and the blade 204 to any angle relative to the tire tread 112 such that the sipe 125 may extend in any direction along the tread plane 140. The plunge fixture 200 may be positioned at any angle relative to the central axis 305 and may include any blade 204 outlined above (e.g., 204a, 204b, 204c, 204d, 204e, 204f, 204g, 204h, 204i, 204k, 204j etc.).

Figure 17:
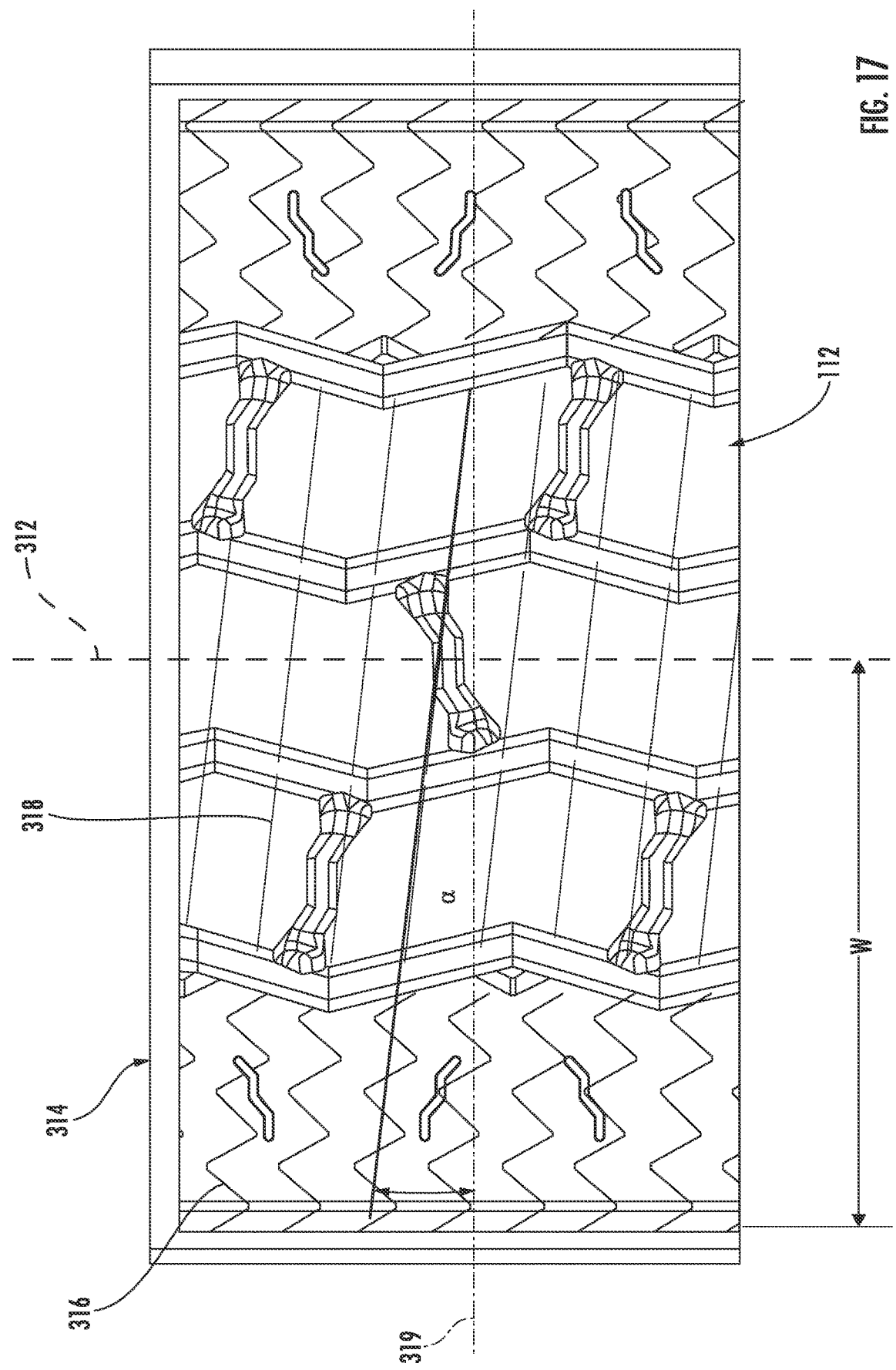
FIG. 17 is a top view of a tire tread having a sipe pattern, according another example embodiment.

Referring now to FIG. 17, the tire tread 112 is shown according to example embodiments. The tire tread 112 is shown having tire tread axis 312. The tire tread axis 312 extends along the circumferential direction of the tire tread 112. In some embodiments, the tire tread 112 is centered on the tire tread axis 312. The tire tread 112 may have a half width "w", measured from the tire tread axis 312 of the tire tread 112 to an axial end thereof. The tire tread 112 includes a sipe pattern 314 having a first sipe 316 and a second sipe 318. The first sipe 316 extends from an edge of the tire tread 112 to approximately 50% of width of the tire tread 112 measured from the axial end. In some embodiments, the first sipe 316 extends from an edge of the tire tread 112 to a range of approximately 25% to 80% of the half width, w, measured from the axial end of the tire tread 112 (e.g., 23.75%, 25%, 30%, 40%, 50%, 60%, 70%, 75%, 80%, 84%, etc.). The second sipe 318 extends from the tire tread axis 312 to approximately 50% of the half width of the tire tread 112 measured from the tire tread axis 312. In some embodiments, the second sipe 318 extends from the tire tread axis 312 to a range of approximately 25% to 75% of the half width w measured from the tire tread axis 312 of the tire tread 112 (e.g., 23.75%, 25%, 30%, 40%, 50%, 60%, 70%, 75%, 78.7%, etc.). The first sipe 316 and the second sipe 318 may extend across the tire tread 112 at an angle α relative to a lateral axis 319 that extends across the tire tread 112. In an example embodiment, the first sipe 316 and the second sipe 318 may be cut using the blade 204i such that the first sipe 316 has a zig-zag (sawtooth) profile and the second sipe 318 has a straight profile.

Figure 18:
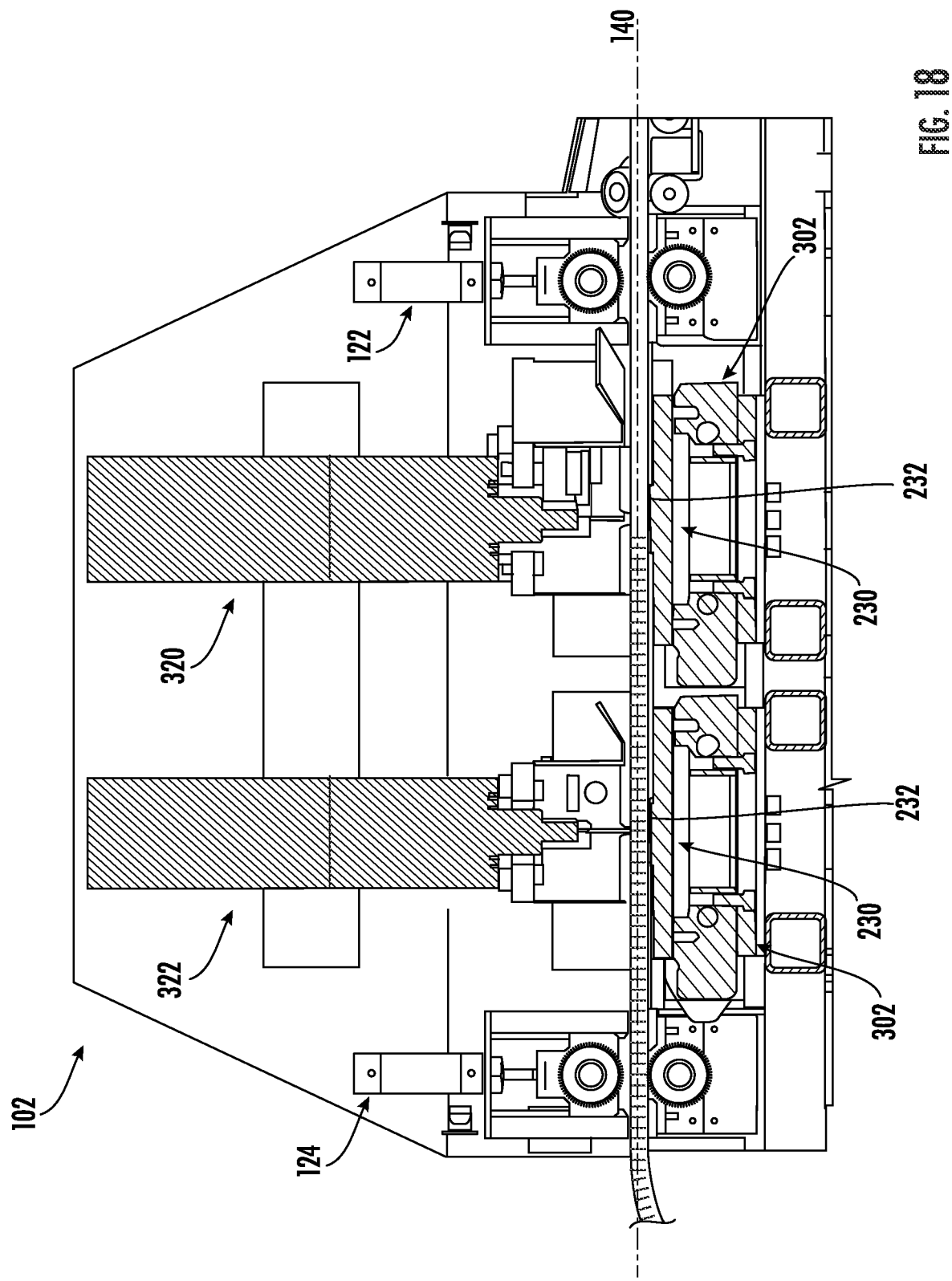
FIG. 18 is a side view of an assembly for forming sipes in a tire tread, according to another example embodiment.

Referring now to FIG. 18, the sipe forming assembly 102 includes a first plunge fixture 320 and a second plunge fixture 322 positioned side-by-side between the leading roller assembly 122 and the trailing roller assembly 124. During a sipe formation process, the first plunge fixture 320 may be set at an angle of 15° and the second plunge fixture 322 may be set at an angle of negative 15° such that a criss-cross sipe pattern is formed. The first plunge fixture 320 and the second plunge fixture 322 may be positioned at any angle relative to the central axis 305 and may include any blade 204 outlined above (e.g., 204a, 204b, 204c, 204d, 204e, 204f, etc.).

Figure 19:
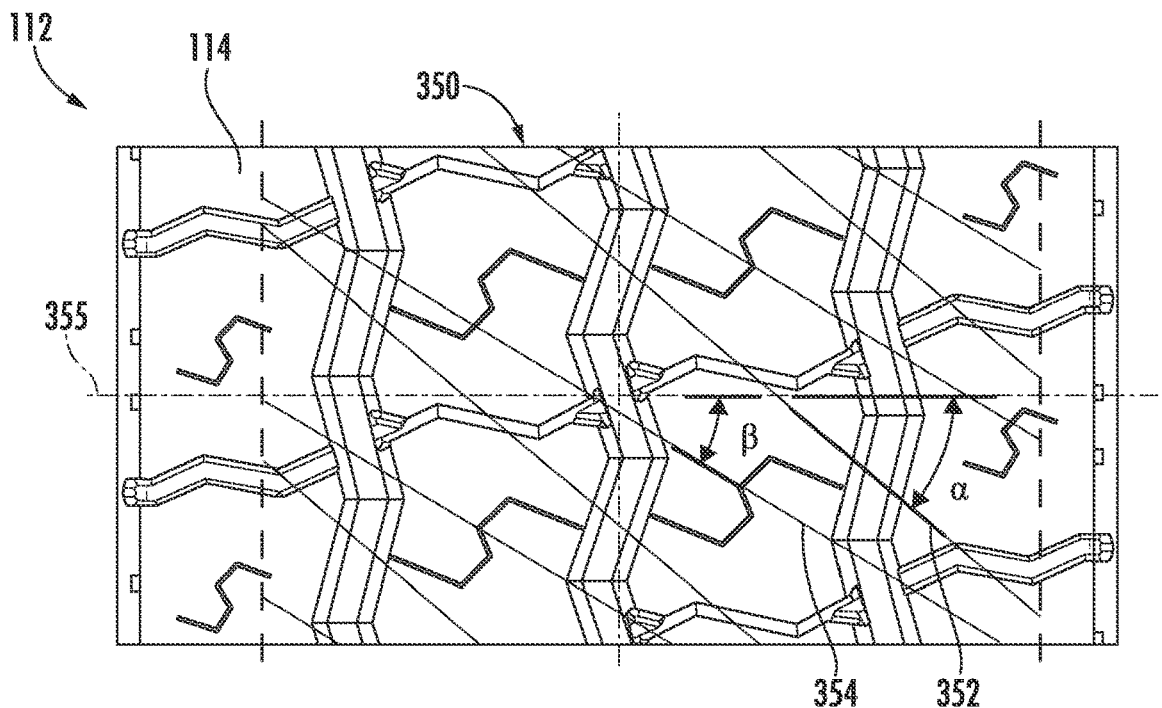
FIG. 19 is a top view of a tire tread having a sipe pattern, according to an example embodiment.
Figure 20:
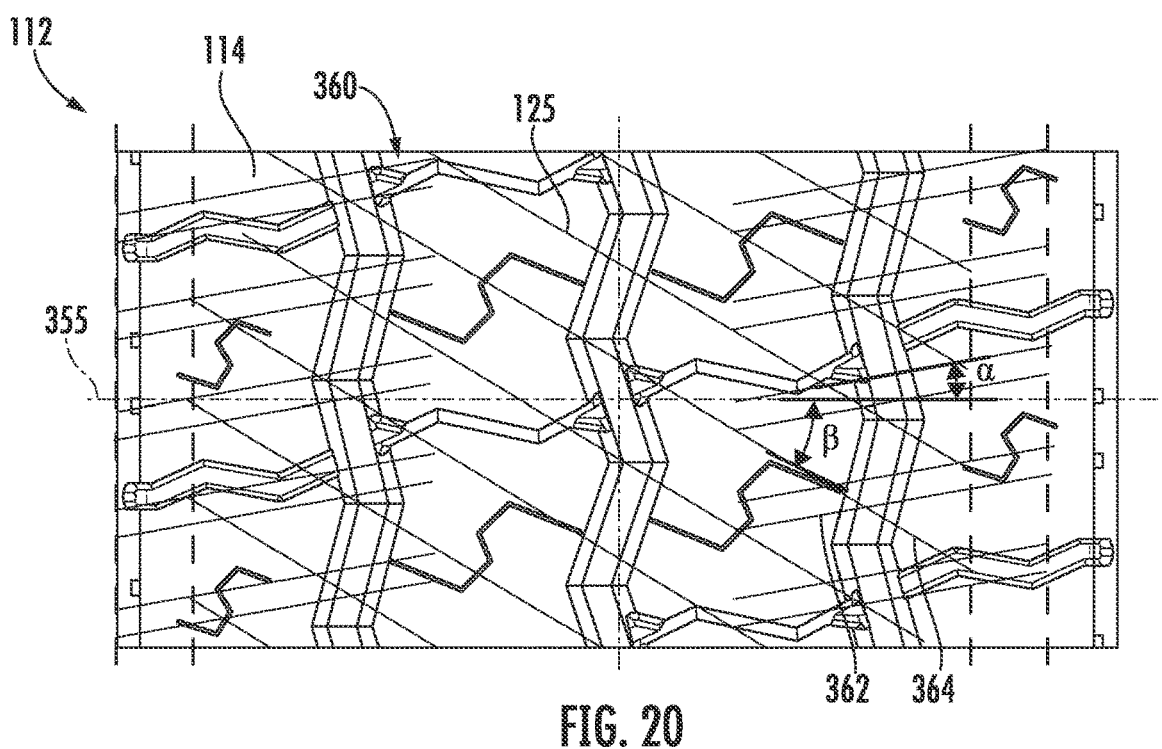
FIG. 20 is a top view of a tire tread having a sipe pattern, according to another example embodiment.
Figure 21:
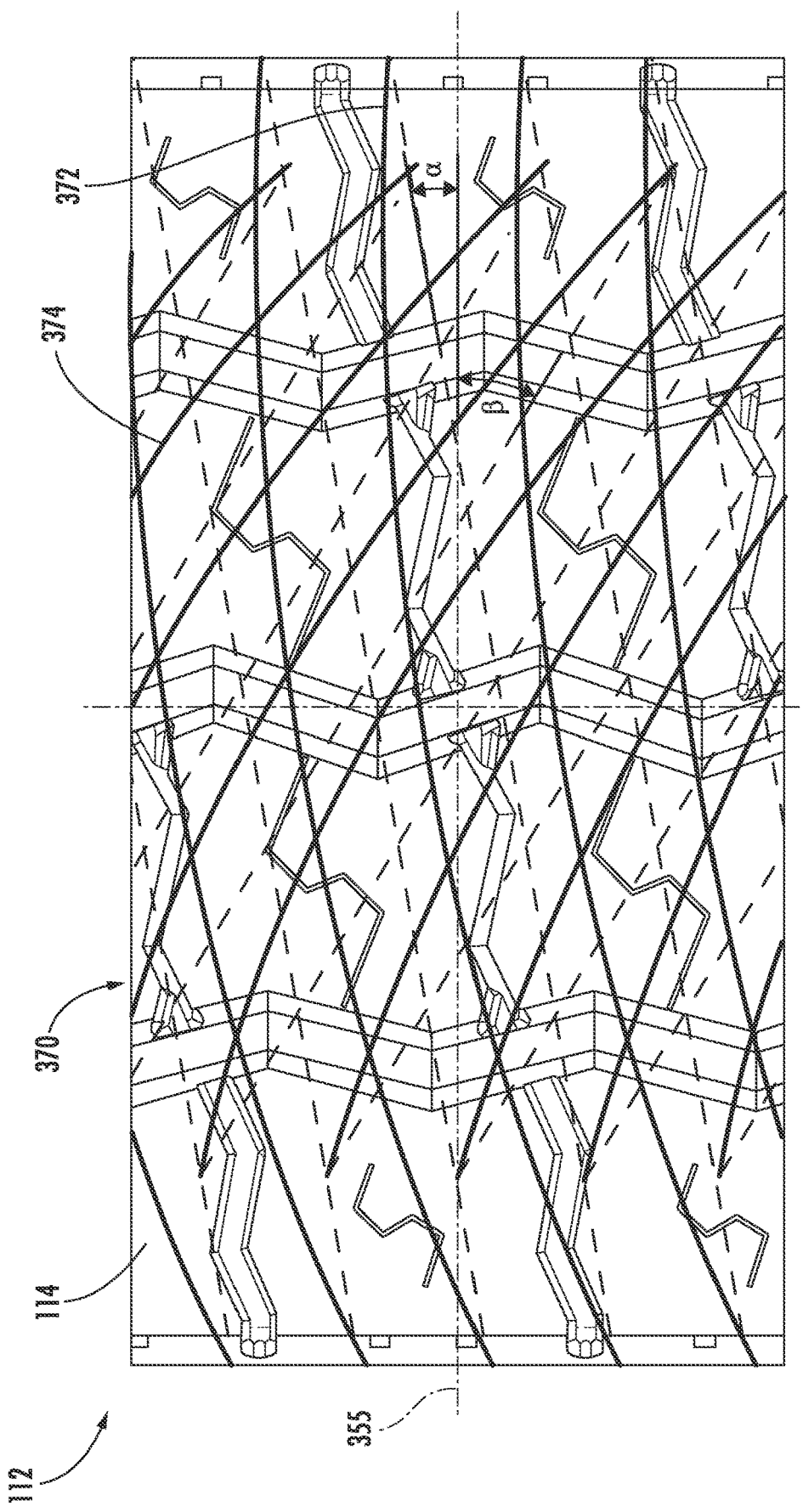
FIG. 21 is a top view of a tire tread having a sipe pattern, according to yet another example embodiment.

Referring now to FIGS. 19-21, the tire tread 112 is shown according to example embodiments. Referring specifically to FIG. 19, the tire tread 112 is shown having a sipe pattern 350 having a first sipe 352 and a second sipe 354. The first sipe 352 extends across the tire tread 112 at a first angle α relative to a lateral axis 355 that extends across the tire tread 112. The lateral axis 355 may be the same as the lateral axis 319. The second sipe 354 extends across the tire tread 112 at a second angle β relative to the lateral axis 355. In some embodiments, the first angle α is different from the second angle β. In some embodiments, the first sipe 352 is cut using the first plunge fixture 320 set to the first angle α and the second sipe 354 is cut using the second plunge fixture 322 set to the second angle β. In some embodiments, the first sipe 352 and the second sipe 354 are cut by the plunge cutting assembly 120 and the rotation assembly 302 rotates the blade 204 between the first angle α and the second angle β between each sipe cut.

Referring specifically to FIG. 20, the tire tread 112 is shown having a sipe pattern 360 having a first sipe 362 and a second sipe 364. The first sipe 362 extends across the tire tread 112 at a first angle α relative to the lateral axis 355. The first sipe 362 may be cut using the blade 204f such that the first sipe 362 is discontinuous proximate the center of the tire tread 112. The second sipe 364 extends across the tire tread 112 at a second angle β relative to the lateral axis 355. The second sipe 364 may be cut using the blade 204e such that the second sipe 364 does not extend all the way through the width of the tire tread 112.

Referring specifically to FIG. 21, the tire tread 112 is shown having a sipe pattern 370 having a first sipe 372 and a second sipe 374. The first sipe 372 extends across the tire tread 112 at a first angle α relative to the lateral axis 355, the first angle α defined by a line that extends between the two ends of the first sipe 372. The first sipe 372 may be cut using the blade 204h such that the first sipe 372 has a curvature (e.g., radius). The second sipe 374 extends across the tire tread 112 at a second angle R relative to the lateral axis 355. The second sipe 374 may be cut using a blade similar to the blade 204h having a different radius or curvature.

Figure 22:
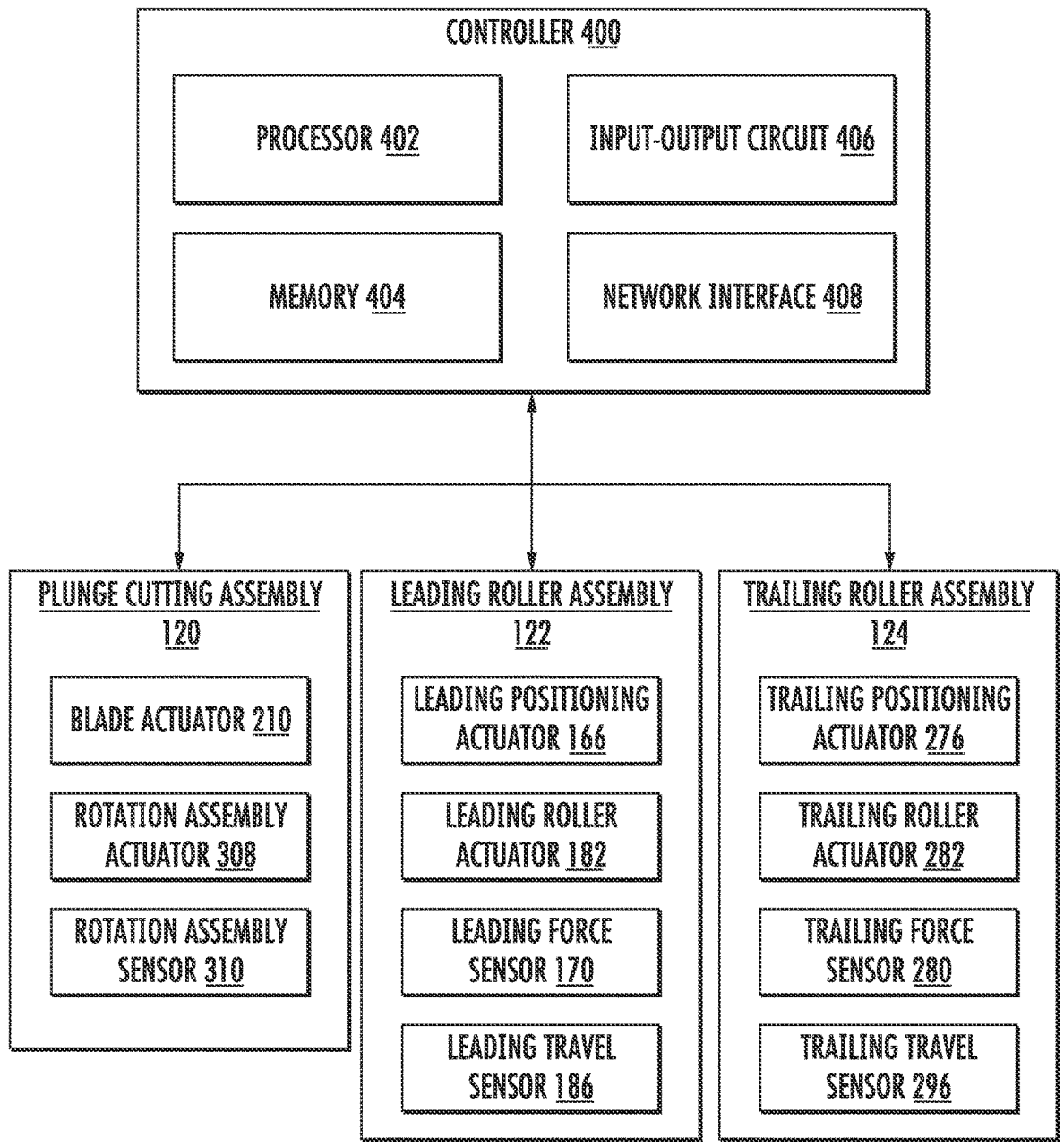
FIG. 22 is a block diagram of a controller of an assembly such as the assembly of either of FIG. 1 or FIG. 18.

Referring now to FIG. 22, the assembly 100 includes a controller 400 configured to operate the leading roller assembly 122, the trailing roller assembly 124, and the plunge cutting assembly 120. The controller 400 includes a processor 402, a memory 404, an input-output circuit 406, and a network interface 408.

The memory 404 may store machine-executable instructions that, when executed by the processor 402, cause the processor 402 to perform one or more of computer operations. The processor 402 may include one or more microprocessors, application specific integrated circuits (ASICs), field programmable gate arrays (FPGAs), other forms of processing circuits, or combinations thereof. The memory 404 may include, but is not limited to, electronic, optical, magnetic, or any other storage or transmission device capable of providing the processor 402 with program instructions. The memory 404 may include storage devices such as a floppy disk, CD-ROM, DVD, magnetic disk, memory chip, ROM, RAM, EEPROM, EPROM, flash memory, optical media, or any other suitable memory from which the processor 402 can read instructions and/or data. At least the processor 402 and the memory 404 may form a processing module. Further circuitry, such as the components and circuits described further herein, may be included in the processing module.

As shown, the controller 400 further includes an input-output circuit 406. The input-output circuit 406 is communicatively coupled to the processor 402 and the memory 404. The input-output circuit 406 includes hardware and associated logics structured to enable an operator or user to exchange information with the controller 400. An input device or component of the input-output circuit 406 allows the user to provide information or commands to the controller 400, and may include, for example, a mechanical keyboard, a touchscreen, a microphone, a camera, a fingerprint scanner, any user input device engageable with the controller 400 via a USB, serial cable, Ethernet cable, and so on. An output device or component of the input-output circuit 406 allows the user to receive information from the controller 400 and may include, for example, a digital display, a speaker, illuminating icons, LEDs, and so on.

The controller 400 further includes a network interface 408. The network interface 408 is structured to retrieve information from a remote computing device and store the information in the memory 404. The user may have access to the data stored in the memory 404 via the network interface 408 and/or the input-output circuit 406. For example, a manufacturer may own and operate many assemblies (e.g., the assembly 100) in many different and remote geographical locations. As new products are developed that include different sipe configurations, it may be challenging to transmit the new sipe configurations through email, meetings, telephone, and similar communications modes. Instead, the operator of the assemblies may upload a program to the controller 400 of each of the sipe forming assemblies via the network interface 408 under a program name, such as "tire tread 001." When the operator goes to create the sipes in the tire tread 112, the operator may select "tire tread 001" from the input-output circuit 406 and allow the sipe forming assembly 102 to manufacture and form the sipes. This avoids the need to send individual instructions to each location that operates the assembly 100. The network interface 408 may receive and store information, such as sipe forming programs, in non-transient data storage mediums (e.g., local disc or flash-based hard drives, local network servers) or remote data storage facilities (e.g., cloud servers).

The controller 400 is communicatively coupled to the plunge cutting assembly 120. Specifically, the controller 400 is communicatively coupled to each of the blade actuator 210, the rotation assembly actuator 308, and the rotation assembly sensor 310. The blade actuator 210 receives instructions from the controller 400 to cut the sipe 125 in the tire tread 112 at a certain frequency dependent on time or travel of the tire tread 112. For example, the "tire tread 001" program selected from the input-output circuit 406 may operate the blade actuator 210 to cut the sipe 125 at between 0.25 inches to 1.5 inches from the neighboring sipe. In some embodiments, the blade actuator 210 is operated to cut the sipe 125 based on elapsed time. For example, the blade actuator 210 may cut the sipe once every 0.5 seconds, every 1 second, and so on. In some embodiments, the blade actuator 210 receives instructions from the controller 400 to cut the sipe 125 at alternating widths between neighboring sipes. For example, the blade actuator 210 may cut the first sipe 352 at 0.25 inches from the second sipe 354 and the blade actuator 210 may cut the second sipe 354 at 0.75 inches from the next neighboring sipe (e.g., a third sipe). In some embodiments, the blade actuator 210 receives instructions from the controller 400 to cut two sipes at different depths. For example, the blade actuator 210 may cut the first sipe 362 at a depth of approximately 50% of the thickness of the tire tread 112 (e.g., approximately 50% of the lugs positioned on the patterned surface 114) and the blade actuator 210 may cut the second sipe 364 at a depth of approximately 75% of the thickness of the tire tread 112 (e.g., approximately 50% of the lugs positioned on the patterned surface 114). In some embodiments, the blade actuator 210 may cut the first sipe 362 at a depth in a range between approximately 5% of the thickness of the tire tread 112 and 115% of the thickness of the tire tread 112 (e.g., 4.75%, 5%, 10%, 20%, 25%, 30%, 40%, 50%, 60%, 70%, 75%, 80%, 90%, 100%, 110%, 115%, 120.75%, etc.).

The rotation assembly actuator 308 and the rotation assembly sensor 310 cooperate to position the blade 204 above the tire tread 112. The rotation assembly actuator 308 may be operated, such as by the controller 400, to rotate the plunge fixture 200, and thus rotate the blade 204. For example, the "tire tread 001" program may cause the controller 400 to provide instructions to the rotation assembly actuator 308 to cut the sipe 125 into the tire tread 112 at an angle of negative 15° relative to the lateral axis 355 of the patterned surface 114. The rotation assembly actuator 308 then rotates the blade 204, and the rotation assembly sensor 310 measures the rotation of the rotation assembly 302 and sends a signal to the rotation assembly actuator 308 when the blade 204 is positioned at an angle of negative 15° relative to the lateral axis 355. In some embodiments, the blade actuator 210 and the rotation assembly actuator 308 cooperate to cut the first sipe 352 and the second sipe 354 at alternating angles. For example, the blade actuator 210 may actuate the blade 204 to cut the first sipe 352 into the patterned surface at the first angle α. After the first sipe 352 is cut, the rotation assembly actuator 308 may rotate the blade 204 to the second angle β to cut the second sipe 354. After the second sipe 354 is cut, the rotation assembly actuator 308 may rotate the blade 204 back to the first angle α such that the blade actuator 210 may cut another sipe similar to the first sipe 352 into the tire tread 112 such that the sipes alternate between the first angle α and the second angle β. During manufacturing of the tire tread 112, the rotation assembly actuator 308 may operate very quickly such that the sipes (e.g., first sipe 352 and the second sipe 354) are formed very quickly, such as at one sipe per second (e.g., one sipe every two seconds, two sipes every second, etc.).

The controller 400 is communicatively coupled to the leading roller assembly 122. Specifically, the controller 400 is communicatively coupled to the leading positioning actuator 166, the leading roller actuator 182, the leading force sensor 170, and the leading travel sensor 186. The leading positioning actuator 166 is coupled to the first roller 132 and is configured to adjust the leading roller distance 158 to pinch the tire tread 112 between the first roller 132 and the second roller 134. The leading force sensor 170 measures the force applied by the first roller 132 and the second roller 134 on the tire tread 112 and sends a signal to the leading positioning actuator 166 if the incorrect force is applied to the tire tread 112. For example, in the "tire tread 001" program, the tire tread 112 may require a greater-than-average clamping force of the tire tread 112. Thus, as the tire tread 112 is fed through the leading roller assembly 122, the leading force sensor 170 may cooperate with the leading positioning actuator 166 to apply the proper clamping force to the tire tread 112.

The leading roller actuator 182 is operably coupled to the roller (e.g., one of the first roller 132 and the second roller 134) that engages the coupling surface 116 of the tire tread 112. As shown in FIG. 2, the leading roller actuator 182 is configured to rotate the second roller 134 and translate the tire tread 112 toward the plunge cutting assembly 120 along the tread plane 140. The leading travel sensor 186 measures the distance traveled by the tire tread 112 through the leading roller assembly 122. In some embodiments, the leading travel sensor 186 cooperates with the blade actuator 210 to cut the sipes at a predetermined frequency. For example, the "tire tread 001" program may include instructions that form sipes spaced apart from one another by 0.3 inches. The leading travel sensor 186 may measure the feed speed of the tire tread 112 through the leading roller assembly 122 and send a signal to the blade actuator 210 to cut the sipe 125 each time 0.3 inches of the tire tread 112 is measured as passing through the leading roller assembly 122.

The controller 400 is communicatively coupled to the trailing roller assembly 124. Specifically, the controller 400 is communicatively coupled to the trailing positioning actuator 276, the trailing roller actuator 292, the trailing force sensor 280, and the trailing travel sensor 296. The trailing positioning actuator 276 is coupled to the first roller 252 and is configured to adjust the trailing roller distance 268 to pinch the tire tread 112 between the first roller 252 and the second roller 254. The trailing force sensor 280 measures the force applied by the first roller 252 and the second roller 254 on the tire tread 112 and sends a signal to the trailing positioning actuator 276 if the incorrect force is applied to the tire tread 112. For example, in the "tire tread 001" program, the tire tread 112 may require a less-than-average clamping force of the tire tread 112. Thus, as the tire tread 112 is fed through the trailing roller assembly 124, the trailing force sensor 280 may cooperate with the trailing positioning actuator 276 to apply the proper clamping force to the tire tread 112.

The trailing roller actuator 292 is operably coupled to the roller (e.g., one of the first roller 252 and the second roller 254) that engages the coupling surface 116 of the tire tread 112. As shown in FIG. 2, the trailing roller actuator 292 is configured to rotate the second roller 254 and translate the tire tread 112 away from plunge cutting assembly 120 along the tread plane 140. The trailing travel sensor 296 measures the distance traveled by the tire tread 112 through the trailing roller assembly 124. In some embodiments, the trailing travel sensor 296 is positioned downstream from the trailing roller assembly 124 and measures the feed speed of the tire tread 112 along the tread plane 140 away from the trailing roller assembly 124. In some embodiments, the trailing travel sensor 296 is operably coupled to the second roller 254 and measures the feed speed of the tire tread 112 along the tread plane 140. In some embodiments, the feed speed of the trailing roller assembly 124 is greater than (e.g., faster than) the feed speed of the leading roller assembly 122 to apply tension to the tire tread 112 positioned between the leading roller assembly 122 and the trailing roller assembly 124. Keeping tension through the tire tread 112 may improve the splice forming process by preventing the blade 204 from being pinched in the tire tread 112 from friction.

Figure 23:
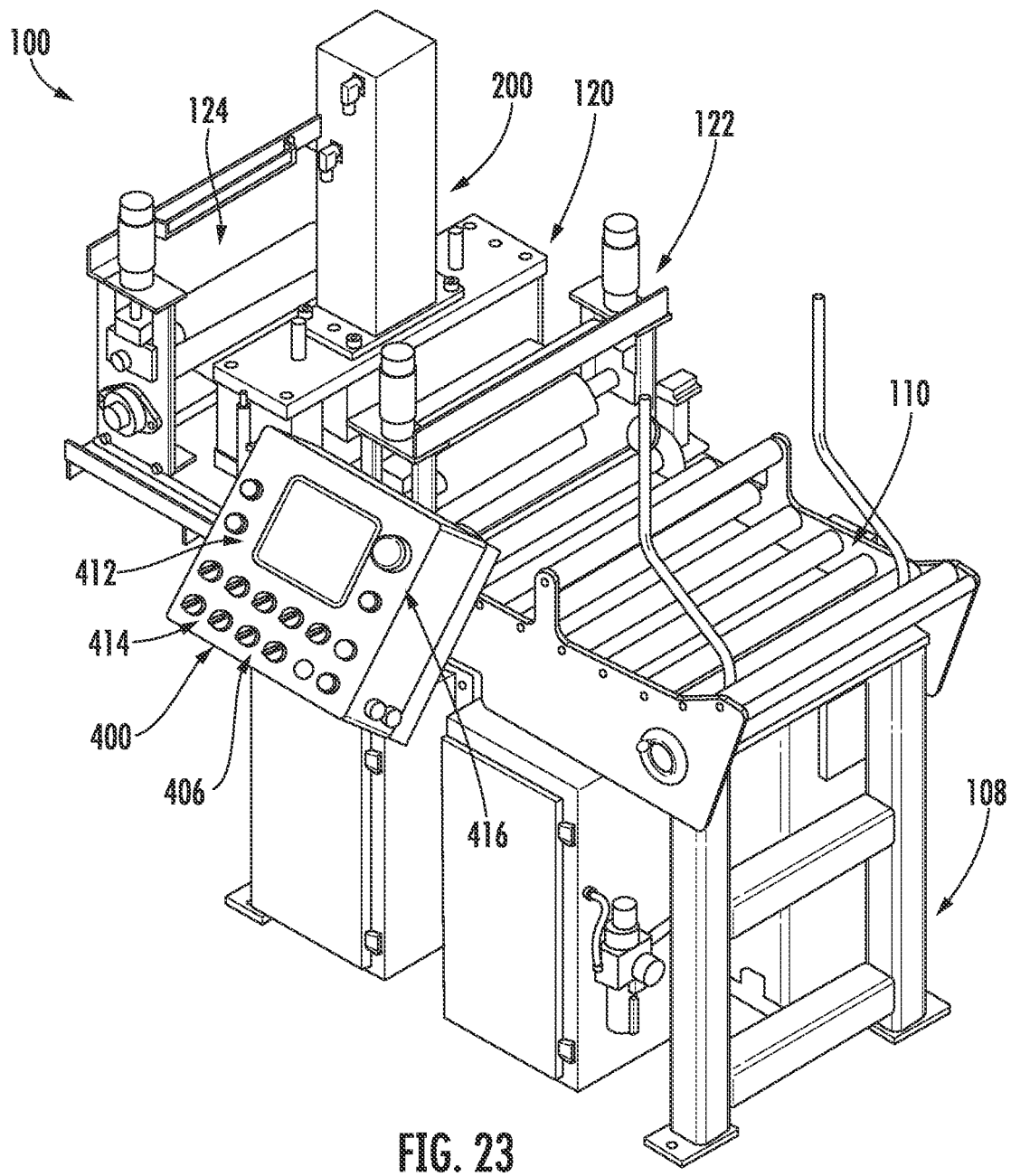
FIG. 23 is a perspective view of the assembly of FIG. 1 having an exemplary controller.

Referring now to FIG. 23, a perspective view of the assembly 100 is shown having the controller 400 operably mounted to the chassis 108. The input-output circuit 406 is shown having a screen 412, a plurality of knobs 414, and a plurality of switches 416.

Figure 24:
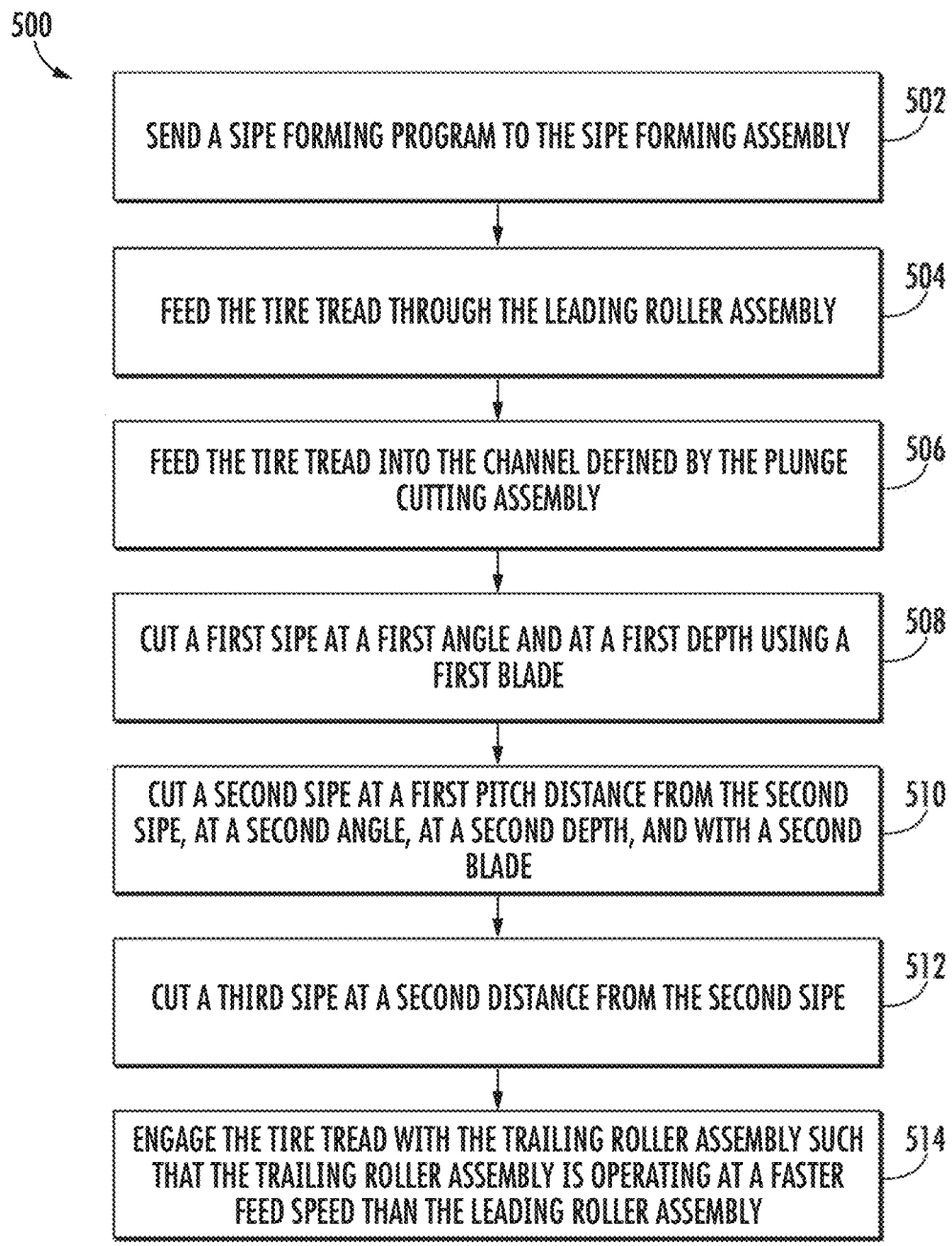
FIG. 24 is a method of forming a sipe in a tire tread, according to an example embodiment.

Referring now to FIG. 24, a method 500 of forming sipes in a tire tread is shown, according to an example embodiment. At 502, the controller 400 sends a program to the sipe forming assembly 102 to form a sipe pattern (e.g., the sipe pattern 350, the sipe pattern 360, etc.) in the tire tread 112. For example, an operator may make a selection using the input-output circuit 406 that begins the sipe forming process.

At 504, the tire tread 112 is fed into the leading roller assembly 122 such that the first roller 132 engages the patterned surface 114 and the second roller 134 engages the coupling surface 116. The second roller 134 is driven by the leading roller actuator 182 to pull the tire tread 112 through the leading roller assembly 122 and toward the plunge cutting assembly 120. While the tire tread 112 is pulled through the leading roller assembly 122, the leading positioning actuator 166 may cooperate with the leading force sensor 170 to apply the appropriate amount of clamping force to the tire tread 112.

At 506, the tire tread 112 is fed through the channel 300 defined by the plunge cutting assembly 120.

At 508, the blade actuator 210 is actuated to cut a first sipe (e.g., the sipe 125, the first sipe 352, the first sipe 362) into the patterned surface 114 of the tire tread 112. The first sipe is cut to a first depth at a first angle with a first blade.

At 510, the blade actuator 210 is actuated to cut another sipe (the sipe 125, the second sipe 354, the second sipe 364) at a first pitch distance from the first sipe. The second sipe is cut to a second depth and at a second angle using a second blade. In some embodiments, such as shown in FIGS. 15 and 16, the first angle is the same as the second angle and the first blade is the same as the second blade. In some embodiments, such as shown in FIG. 14, the first angle is different from the second angle and the first blade is different from the second blade.

At 512, the blade actuator 210 is actuated to cut another sipe (e.g., a third sipe) at a second pitch distance from the second sipe. The second pitch distance may be different from the first pitch distance. In some embodiments, the first pitch distance and the second pitch distance are the same.

At 514, the trailing roller assembly 124 engages the tire tread 112 and pulls the tire tread 112 away from the plunge cutting assembly 120. In some embodiments, the trailing roller assembly 124 is operated at a trailing feed speed greater than a leading feed speed of the leading roller assembly 122.

Figure 25:
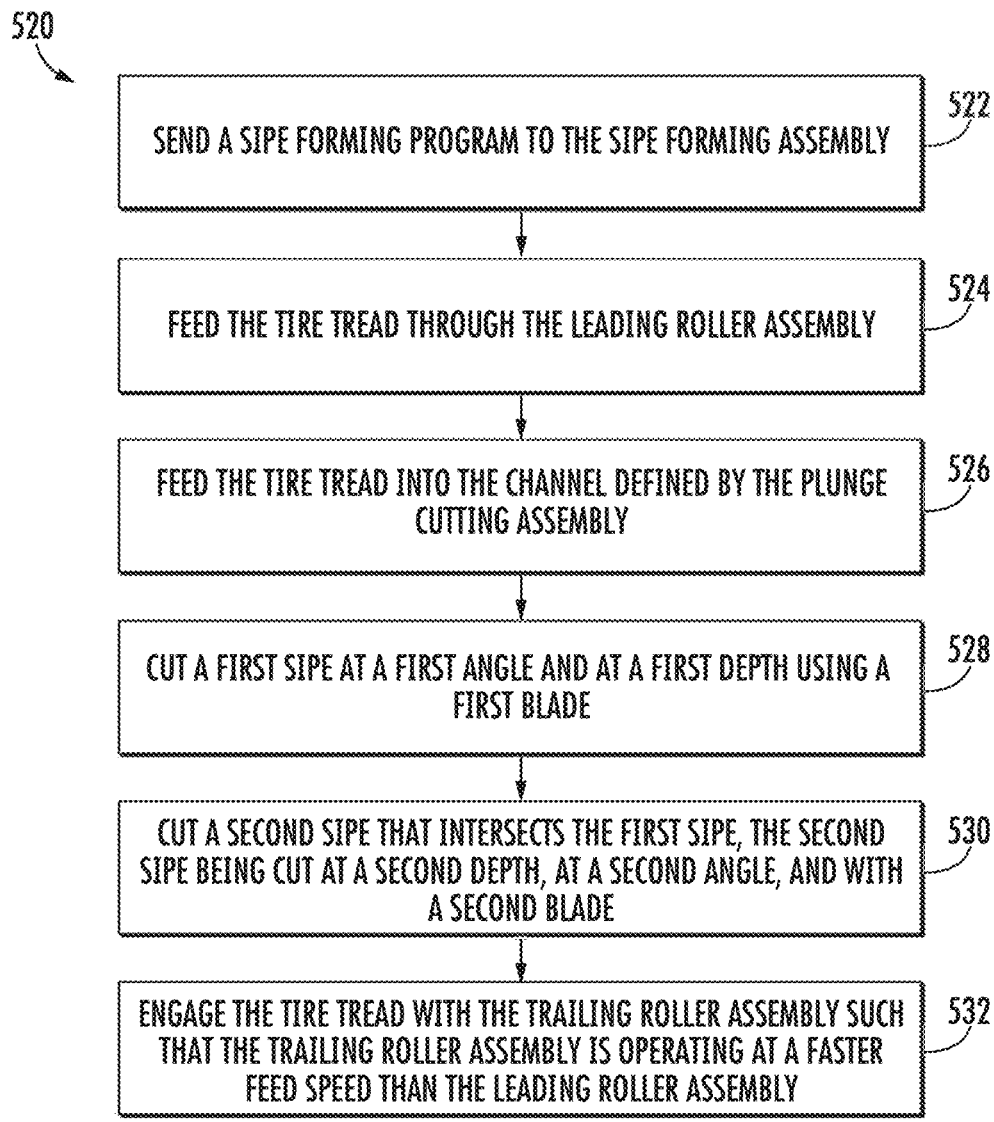
FIG. 25 is a method of forming a sipe in a tire tread, according to another example embodiment.

Referring now to FIG. 25, a method 520 of forming sipes in a tire tread is shown, according to another example embodiment. The method 500 is similar to the method 520. A difference between the method 520 and the method 500 is that the second sipe intersects the first sipe.

At 522, the controller 400 sends a program to the sipe forming assembly 102 to form a sipe pattern (e.g., the sipe pattern 350, the sipe pattern 360, etc.) in the tire tread 112. For example, an operator may make a selection on the input-output circuit 406 that begins the sipe forming process.

At 524, the tire tread 112 is fed into the leading roller assembly 122 such that the first roller 132 engages the patterned surface 114 and the second roller 134 engages the coupling surface 116. The second roller 134 is driven by the leading roller actuator 182 to pull the tire tread 112 through the leading roller assembly 122 and toward the plunge cutting assembly 120. While the tire tread 112 is pulled through the leading roller assembly 122, the leading positioning actuator 166 may cooperate with the leading force sensor 170 to apply the appropriate amount of clamping force to the tire tread 112.

At 526, the tire tread 112 is fed through the channel 300 defined by the plunge cutting assembly 120.

At 528, the blade actuator 210 is actuated to cut a first sipe (e.g., the sipe 125, the first sipe 352, the first sipe 362) into the patterned surface 114 of the tire tread 112. The first sipe is cut to a first depth at a first angle with a first blade.

At 530, the blade actuator 210 is actuated to cut another sipe (the sipe 125, the second sipe 354, the second sipe 364) into the patterned surface 114 that intersects the first sipe. The second sipe is cut to a second depth and at a second angle using a second blade. In some embodiments, such as shown in FIGS. 15 and 16, the first angle is the same as the second angle and the first blade is the same as the second blade. In some embodiments, such as shown in FIG. 14, the first angle is different from the second angle and the first blade is different from the second blade.

At 532, the trailing roller assembly 124 engages the tire tread 112 and pulls the tire tread 112 away from the plunge cutting assembly 120. In some embodiments, the trailing roller assembly 124 is operated at a trailing feed speed greater than a leading feed speed of the leading roller assembly 122.

Figure 26:
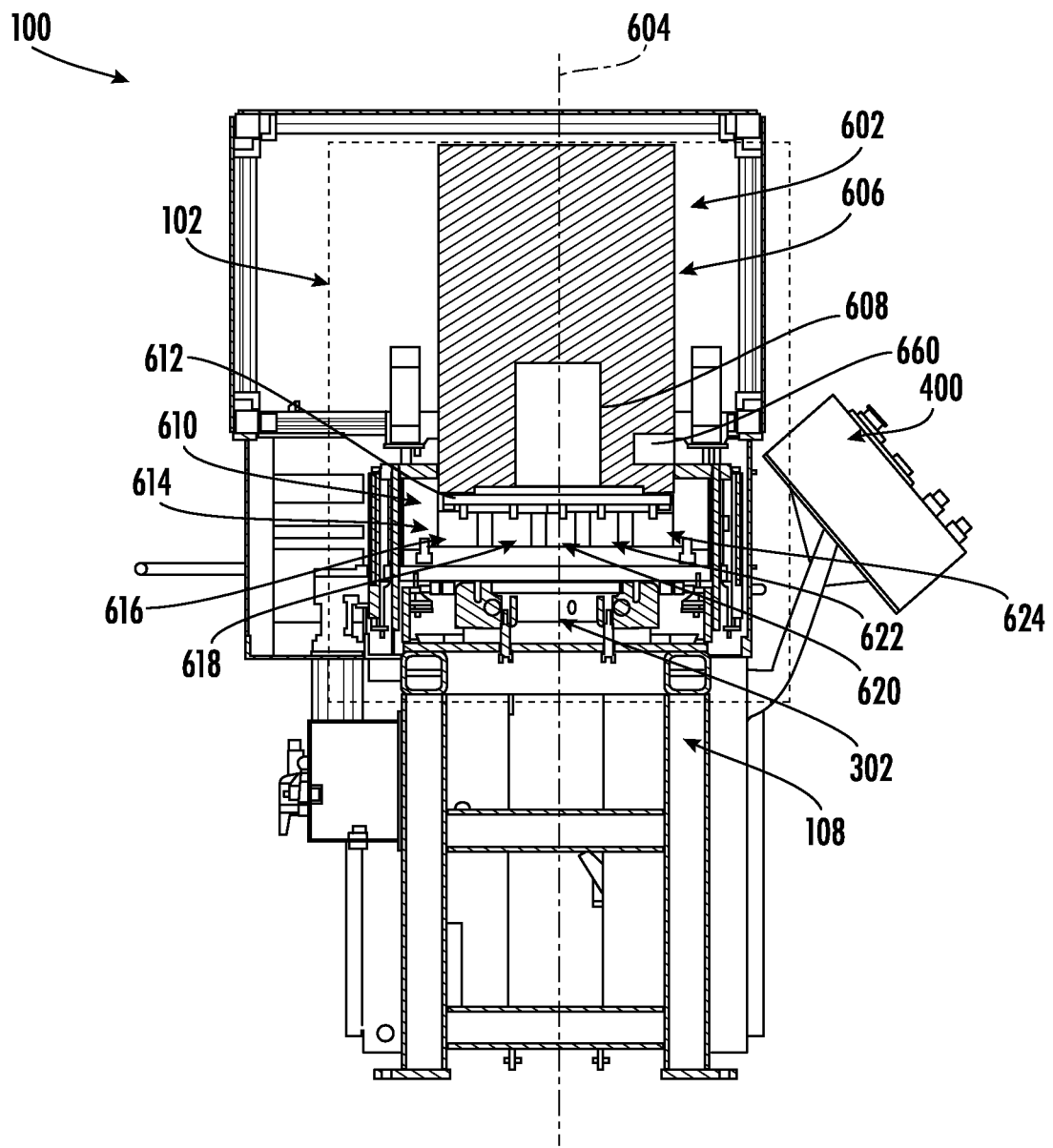
FIG. 26 is a front cross-sectional view of an assembly for forming sipes in a tire tread, according to an example embodiment.

Referring now to FIG. 26, a detailed cross-sectional view of the assembly 100, according to another embodiment is shown from a view of window A of FIG. 1. Specifically, the assembly 100 includes sipe forming assembly 102. The sipe forming assembly 102 includes a plunge cutting assembly 602. The plunge cutting assembly 602 may differ from the plunge cutting assembly 120. The plunge cutting assembly 602 is positioned along a blade plane 604 and downstream from the leading roller assembly 122. In some embodiments, the plunge cutting assembly 602 is centered on the blade plane 604. The plunge cutting assembly 602 is configured to cut a plurality of sipes into the tire tread 112. The plunge cutting assembly 602 includes a plunge fixture 606. The plunge fixture 606 includes a plunge blade actuator 608 (e.g., electric linear actuator, hydraulic linear actuator, pneumatic linear actuator, etc.). The plunge blade actuator 608 is configured to actuate relative to the blade plane 604.

The plunge cutting assembly 602 includes a blade assembly 610. The blade assembly 610 includes a blade plate 612. The blade plate 612 is coupled to the plunge fixture 606 and operably coupled to the plunge blade actuator 608. The plunge blade actuator 608 actuates the blade plate 612 causing the blade assembly 610 to actuate relative to the blade plane 604. The blade assembly 610 includes a plurality of blades 614. Each of the plurality of blades 614 are coupled to the blade plate 612 and are configured to move relative to the blade plane 604 and cut a sipe into the patterned surface 114 of the tire tread 112. Specifically, as the plunge blade actuator 608 actuates the blade plate 612, the plurality of blades 614 are caused to actuate relative to the blade plane 604 and cut the sipe into the patterned surface 114 of the tire tread 112. In some embodiments, the blade assembly 610 is configured to actuate so as to rotate about the blade plane 604 such that the plurality of blades 614 cut the sipe at an angle relative to the tire tread 112. In some embodiments, the blade assembly 610 rotates between a range of −90° and 90°, inclusive.

The plurality of blades 614 may include a first blade 616, a second blade 618, a third blade 620, a fourth blade 622, and a fifth blade 624. In some embodiments, the plurality of blades includes a first blade 616, a second blade 618, and a third blade 620. Each of the plurality of blades 614 (the first blade 616, the second blade 618, the third blade 620, the fourth blade 622, the fifth blade 624, etc.) may be formed having different edge characteristics depending on the application of the tire tread 112. In some embodiments, the second blade 618, the third blade 620, and the fourth blade 622 are formed having the same edge characteristics and the first blade 616 and the fifth blade 624 are formed having the same edge characteristics which are different from the edge characteristics of the second blade 618, the third blade 620, and the fourth blade 622. In some embodiments, the first blade 616 and the third blade 620 are formed having the same edge characteristics and the second blade 618 is formed having an edge characteristic different from the edge characteristics of the first blade 616 and the third blade 620.

Figure 27:
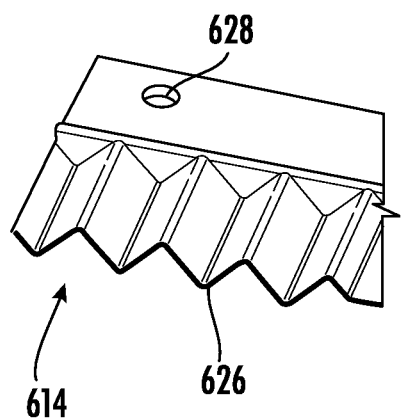
FIG. 27 is a perspective view of a blade for use with the assembly, according to yet another example embodiment.
Figure 28:
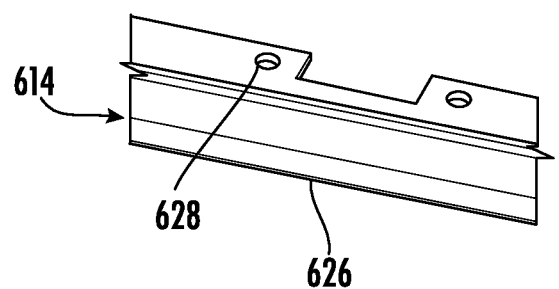
FIG. 28 is a perspective view of a blade for use with the assembly, according to yet another example embodiment.
Figure 29:
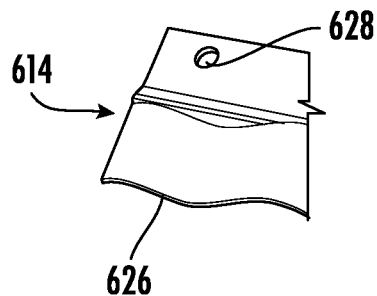
Figure 30:
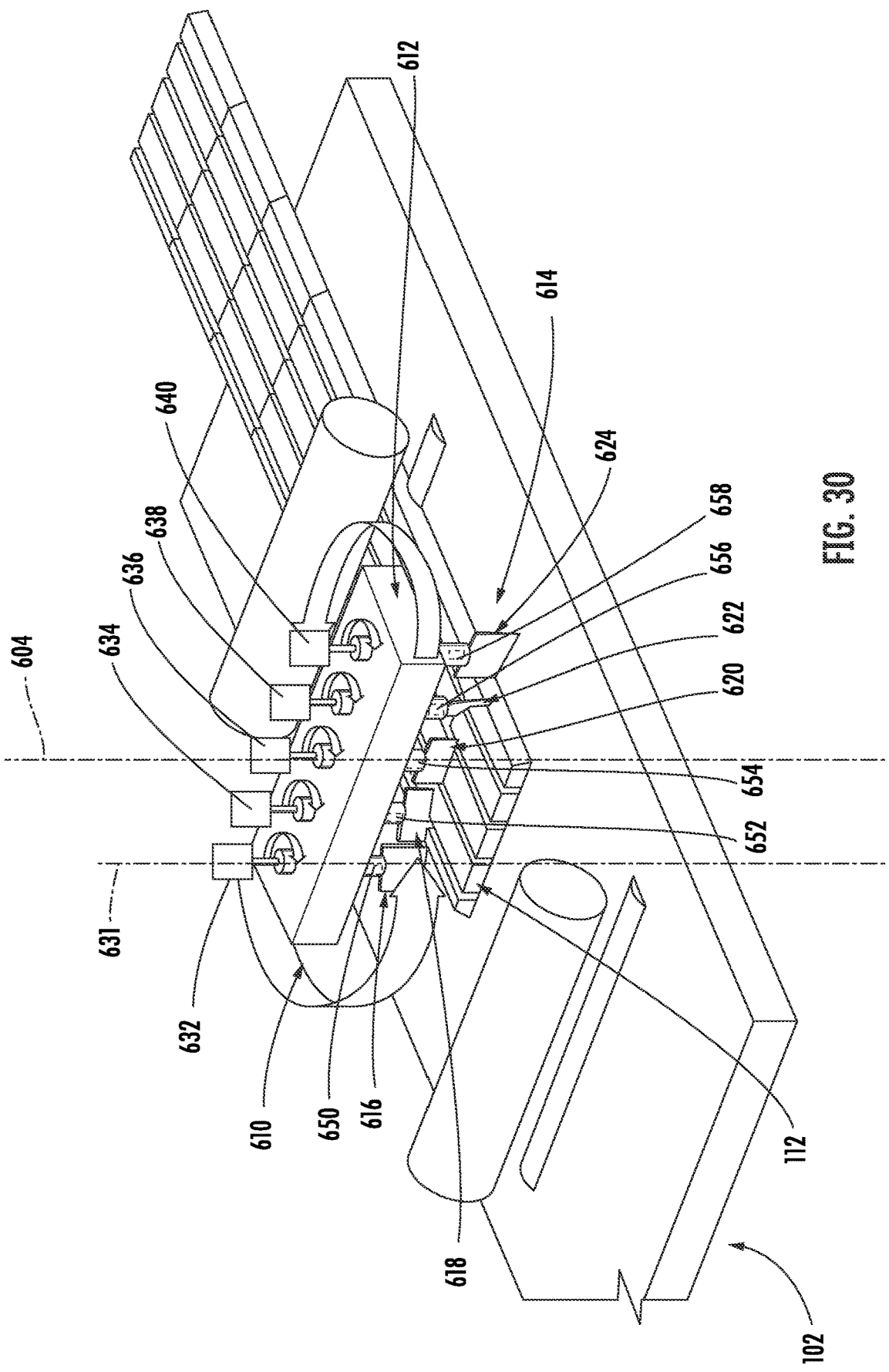
FIG. 30 is a perspective view of the sipe forming assembly of the assembly for cutting sipes, according to an example embodiment.

Referring to FIG. 27-29, each of the plurality of blades 614 have a blade edge 626 that extends parallel to the blade plane 604. The blade edge 626 is defined by profile which makes up the edge characteristic. In an example embodiment, as seen in FIG. 27, the blade edge 626 is defined by a zig-zag profile. In another example embodiment, as seen FIG. 28, the blade edge 626 is defined by a straight profile. In yet another example embodiment, as seen in FIG. 29, the blade edge 626 is defined by a wavy profile. In some embodiments, the blade edge 626 of each of the plurality of blades 614 may be defined by a profile which is straight, non-linear, zig-zag, wavy, sinusoidal, square-shaped, convex, concave, etc. Each of the plurality of blades 614 may have the same and/or different blade edge 626 to form a sipe 125 with varying pattern into the tire tread 112. Further each of the plurality of blades include a blade coupling member 628 configured to removably couple each of the plurality of blades 614 from the blade plate 612. The blade coupling member 628 may be formed of plastic, metal, wood, a polymer, or a similar material. In some embodiments, the blade coupling member 628 is formed separately from the blade 204 and is later coupled to the blade 204. The blade coupling member 628 may be coupled to the blade plate 612 using fasteners, latches, clamps, or a similar coupling system Referring now to FIG. 30, a detailed view of the sipe forming assembly 102 is shown. The blade assembly 610 includes the blade plate 612. The blade assembly 610 includes the plurality of blades 614. Each of the plurality of blades 614 are coupled to the blade plate 612. Additionally, each of the plurality of blades 614 may also be rotationally coupled to the blade plate 612 and configured to rotate about an axis parallel to the blade plane 604. In some embodiments, the plurality of blades 614 rotate independently of one another, for example the first blade 616 rotates independently of the second blade 618. In some embodiments, the first blade 616 is configured to rotate about a first blade plane 630. The first blade plane 630 is parallel to the blade plane 604. In some embodiments, the first blade 616 may be rotated manually by a user to a desired angle. Specifically, the first blade 616 may rotate in a range between about 0° to about 360°, inclusive about the first blade plane 630. In some embodiments, the second blade 618, the third blade 620, the fourth blade 622, and the fifth blade 624 are substantially similar to the first blade 616 and therefore rotate about their own respective blade planes.

In some embodiments, the blade assembly 610 includes a first blade actuator 632 (e.g., rotary actuator, linear-rotary actuator, motor, etc.). The first blade actuator 632 is configured to actuate the first blade 616 when controlled. The first blade actuator 632 is controlled such that the first blade 616 rotates about the first blade plane 630 in a range between about 0° to about 360°, inclusive. The blade assembly 610 may also include a second blade actuator 634, a third blade actuator 636, a fourth blade actuator 638 and a fifth blade actuator 640. The second blade actuator 634, the third blade actuator 636, the fourth blade actuator 638 and the fifth blade actuator 640 are all configured similarly to the first blade actuator 632 and configured to actuate their respective blades independently of one another (e.g., second blade 618, third blade 620, fourth blade 622, fifth blade 624, etc.). For example, the first blade actuator 632 may actuate the first blade 616 to a first angle in a range between about 0° and about 360°, and the second blade actuator 634 may actuate the second blade 618 to a second angle in a range between about 0° and about 360° where the second angle is different from the first angle. In some embodiments, the second angle may be equivalent to the first angle.

Figure 31:
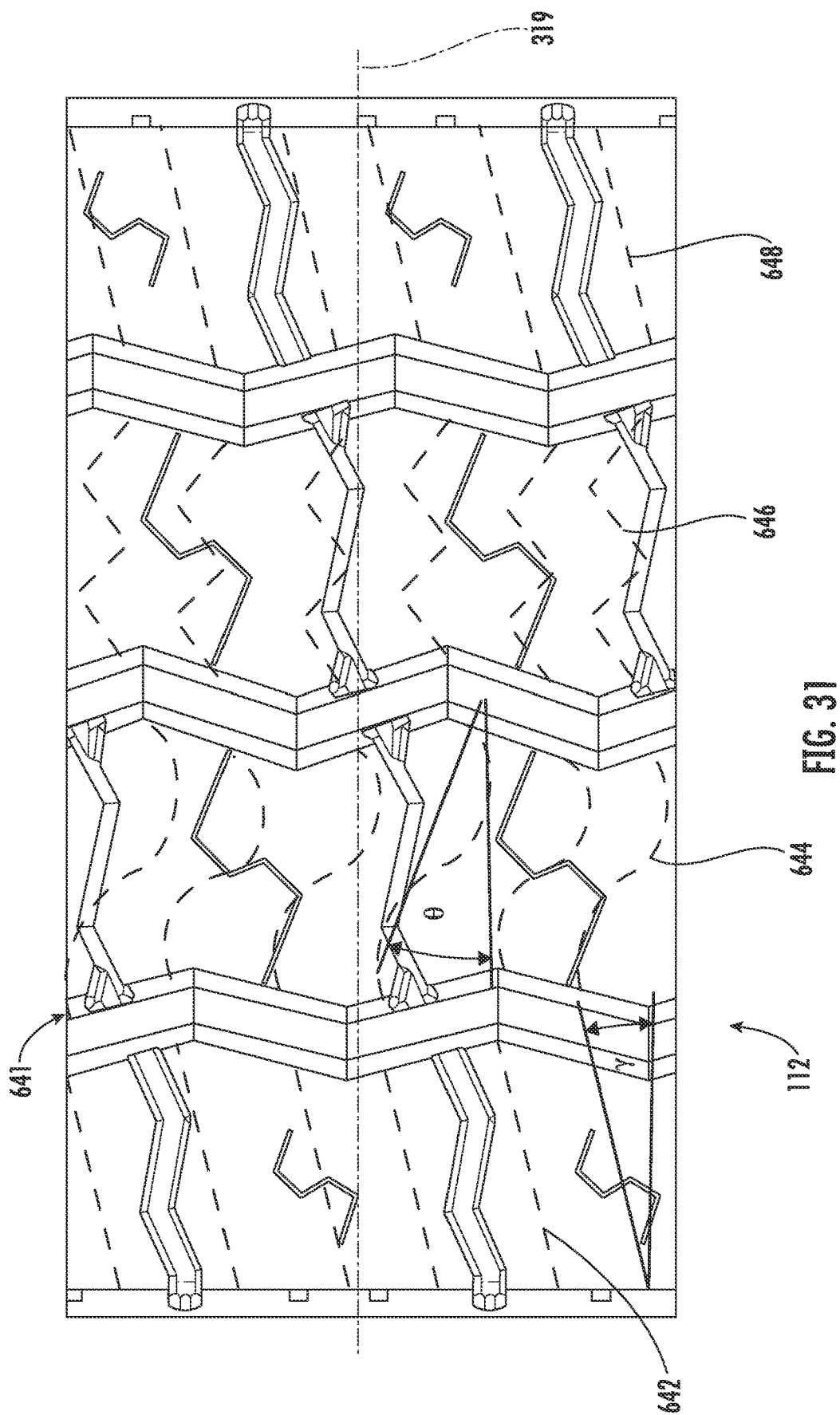
FIG. 31 is a top view of a tire tread having a sipe pattern, according to another example embodiment.
Figure 32:
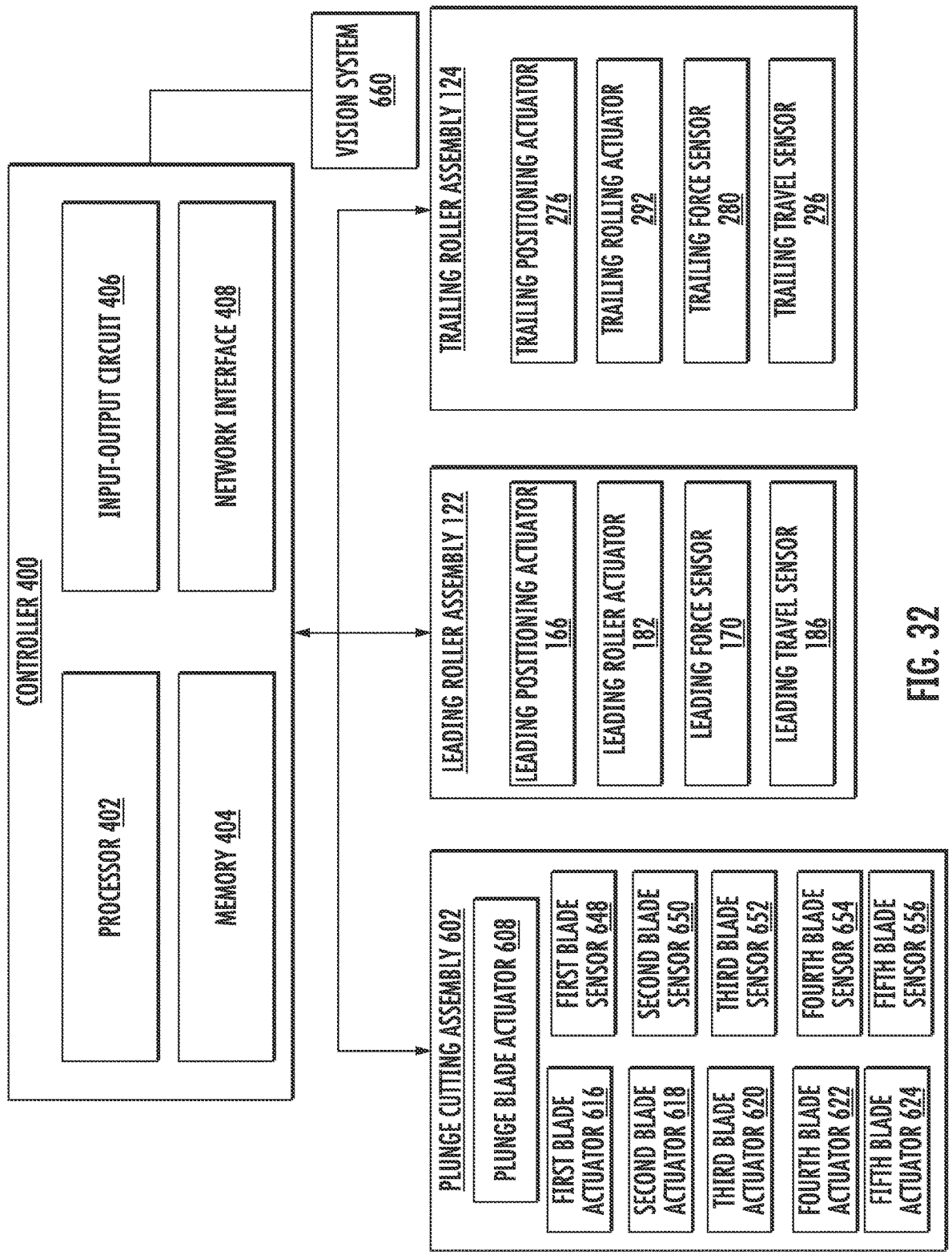
FIG. 32 is block diagram of a controller of the assembly of FIG. 26.

In some embodiments, by rotating each of the plurality of blades 614, a plurality of sipes at various degrees are formed into and across the tire tread 112. Referring to FIG. 31, an example embodiment of a detailed top view of the tire tread 112 having sipe pattern 641. The sipe pattern 641 formed by a plurality of sipes at various angles formed by the plurality of blades 614 is shown. The tire tread 112 has a first sipe 642 formed at an angle, $\gamma$, by the first blade 616, where the angle $\gamma$ is in a range between about −90° and about 90°, inclusive relative to the lateral axis 319 of the tire tread 112. In some embodiments, the first sipe 642 formed may have a linear profile, a zig-zag profile, a sinusoidal profile, etc. as determined by the edge characteristic of the blade edge 626 of the first blade 616. The tire tread 112 has a second sipe 644 formed at an angle, $\theta$, by the second blade 618, where the angle $\theta$ is in a range between about −90° and about 90°, inclusive with relative to the lateral axis 319 of the tire tread 112. In some embodiments, the second sipe 644 formed may have a linear profile, a zig-zag profile, a sinusoidal profile, etc. as determined by the edge characteristic of the blade edge 626 of the first blade 616. By facilitating formation of multiple sipes with various profiles and at various angles, the traction of the tire tread may be improved. In some embodiment, the tire tread 112 may include a third sipe 646 and a fourth sipe 648. The third sipe 646 and the fourth sipe 648 is formed similarly to the first sipe 642 and the second sipe 644. The third sipe 646 may be formed having a similar or different profile and at a different angle than the first sipe 642 and the second sipe 644. The fourth sipe 648 may be formed having a similar or different profile and at a different angle than the first sipe 642 and the second sipe 644. In some embodiments, the tire tread 112 may also include a fifth sipe similarly formed.

Referring back to FIG. 30, the plunge cutting assembly 602 includes a first blade sensor 650, such as an encoder, that measures the angle of the first blade 616 as the first blade 616 is actuated. The first blade sensor 650, in some embodiments, the first blade sensor 650 is coupled to the first blade 616. In some embodiments, the first blade sensor 650 is coupled within the blade plate 612 between the first blade actuator 632 and the first blade 616. The first blade actuator 632 and the first blade sensor 650 cooperate to position the first blade 616 above the tire tread 112. The first blade actuator 632 is operated to rotate the first blade 616 and the first blade sensor 650 determined the angle of the first blade 616 as the first blade is rotated. The blade assembly 610 includes a second blade sensor 652, a third blade sensor 654, a fourth blade sensor 656, and a fifth blade sensor 658 which may be substantially similar to the first blade sensor 650.

Referring back to FIG. 26, the sipe forming assembly 102 includes an imaging system 660 (e.g., a vision system, camera, sensor, etc.) in some embodiments. In some embodiments the imaging system 660 is coupled to the plunge cutting assembly 602. In some embodiments, the imaging system 660 is coupled to the blade plate 612. The imaging system 660 is configured to detect the position of one or more of the first blade 616, the second blade 618, the third blade 620, the fourth blade 622, and the fifth blade 624 relative to the tire tread 112. For example, as the leading roller assembly 122 and the trailing roller assembly 124 are operated to cause the translation of the tire tread 112, the imaging system 660 system determines the position of the first blade 616, the second blade 618, the third blade 620, fourth blade 622, and the fifth blade 624 above the tire tread 112. In some embodiments, the imaging system 660 is configured to communicate with a controller for the plunge cutting assembly 602 to provide the sensed position information to the plunge cutting assembly 602.

In some embodiments, the plunge blade actuator 608 is actuated so as to form a sipe. In some embodiments, the leading roller assembly and the trailing roller assembly 124 are operated to cause movement of the tire tread 112 to properly position the first blade 616, the second blade 618, the third blade 620, the fourth blade 622, and the fifth blade 624 above the tire tread 112.

The controller 400 is communicatively coupled to the plunge cutting assembly 602. Specifically, the controller is communicatively coupled to one or more of the plunge blade actuator 608, the first blade actuator 632, the second blade actuator 634, the third blade actuator 636, the fourth blade actuator 638, the fifth blade actuator 640, the first blade sensor 650, the second blade sensor 652, the third blade sensor 654, the fourth blade sensor 656, and the fifth blade sensor 658.

In operation, the first blade actuator 632 is operated by the controller 400. Specifically, the first blade actuator 632 receives a first instruction from the controller 400 to rotate the first blade 616 to an angle. For example, the controller 400 may provide the first instruction to the first blade 616 to the angle γ. As the first blade 616 rotates, the first blade sensor 650 measures the rotation of the first blade 616 and transmits a signal to the controller 400 when the first blade 616 is positioned at the desired angle. Based on receiving the signal from the first blade sensor 650, the controller 400 transmits a second instruction to the first blade actuator 632 such that the first blade actuator 632 does not rotate the first blade 616. The controller 400 is communicatively coupled to the second blade actuator 634 and the second blade sensor 652 and configured to operate the second blade actuator 634 to rotate the second blade 618 substantially similar to the operation of the first blade actuator 632 and the first blade sensor 650 to rotate the first blade 616. Further, the controller 400 may operate the second blade actuator 634 such that the second blade 618 is rotated to an angle different than the first blade 616. For example, the controller 400 operates the second blade actuator 634 to rotate to the angle θ. In some embodiments, the second blade actuator 634 and the first blade actuator 632 are operated simultaneously.

The controller 400 is communicatively coupled to the third blade actuator 636 and the third blade sensor 654, the fourth blade actuator 638 and the fourth blade sensor 656, and the fifth blade actuator 640 and the fifth blade sensor 658 and is configured to operate the third blade actuator 636 to rotate the third blade 620, the fourth blade actuator 638 to rotate the fourth blade 622, and the fifth blade actuator 640 to rotate the fifth blade 624 substantially similar to the operation of the first blade actuator 632 and the first blade sensor 650 to rotate the first blade 616. In some embodiments, the third blade actuator 636, the fourth blade actuator 638 and the fifth blade actuator 640 are operated simultaneously with each other and with the first blade actuator 632 and the second blade actuator 634.

The controller 400 is communicatively coupled to the leading roller assembly 122 and trailing roller assembly 124 which operates similarly as described above. The controller 400 is communicatively coupled to the imaging system 660. The imaging system 660 determines the position of the first blade 616, the second blade 618, the third blade 620, the fourth blade 622, and the fifth blade 624 relative to the tire tread 112. The imaging system 660 determines that the position of the first blade 616, the second blade 618, the third blade 620, the fourth blade 622, and the fifth blade 624 relative to the tire tread 112 is proper and transmits a signal to the controller 400. The controller 400 operates the plunge blade actuator 608 to cut the sipe with each of the first blade 616, the second blade 618, the third blade 620, the fourth blade 622, and the fifth blade 624 in the tire tread 112. In some embodiments, the imaging system 660 determines that the position of the first blade 616, the second blade 618, the third blade 620, the fourth blade 622, and the fifth blade 624 relative to the tire tread 112 is incorrect. The imaging system 660 transmits a signal to the controller 400 to operate the leading roller assembly 122 and/or the trailing roller assembly 124 to cause movement of the tire tread 112 until the position thereof is a desired position.

In some embodiments, for example, the "tire tread 002" program may cause the controller 400 to provide instructions to the first blade actuator 632 to rotate the first blade 616 to (e.g., to a desired first angle, such as an angle of negative 15°), may provide instruction to the second blade actuator 634, the third blade actuator 636, and the fourth blade actuator 638 to rotate the second blade 618, the third blade 620, and the fourth blade 622 (e.g., to a desired second angle, such as an angle of 0°), respectively, and may provide instructions to the fifth blade actuator 640 to rotate the fifth blade 624 to a desired third angle (e.g., an angle of 15°). The imaging system 660 determines the position of the first blade 616, the second blade 618, the third blade 620, the fourth blade 622, and the fifth blade 624 relative to the tire tread 112 and provides the controller 400 with a signal. Based on the signal received, the controller 400 may operate the leading roller assembly 122 and the trailing roller assembly 124 to cause movement of the tire tread 112 to the proper position. The controller 400 operates the plunge blade actuator 608 to cut the sipe (as shown in FIG. 31) with one or more of, or each of, the first blade 616, the second blade 618, the third blade 620, the fourth blade 622, and the fifth blade 624.

Figure 33:
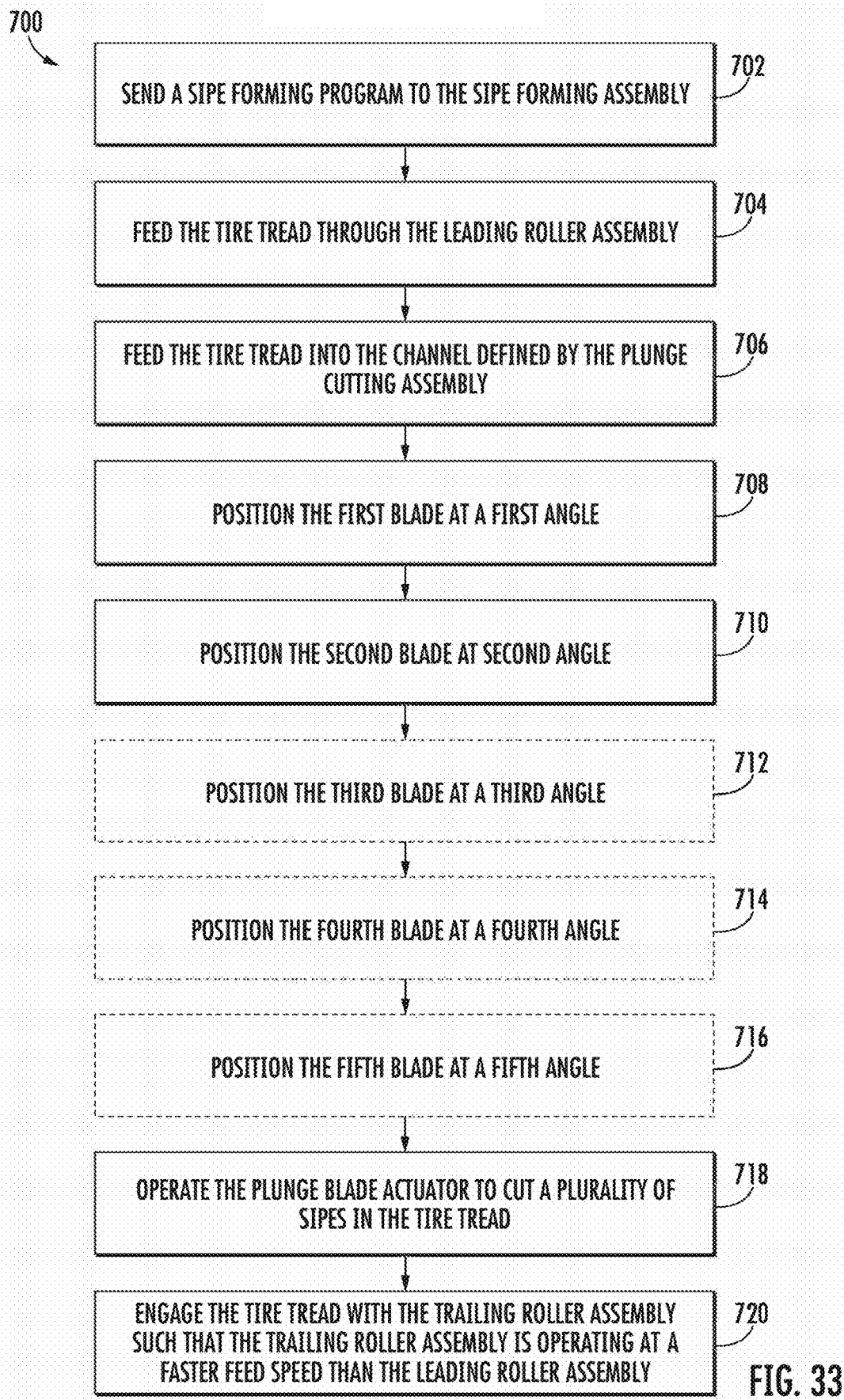
FIG. 33 is a method of forming a sipe in a tire tread according to another example embodiment.

Referring now to FIG. 33, a method 700 of forming sipes in a tire tread is shown according to an example embodiment. At 702, the controller 400 executes a program or otherwise commands a program to run to control to the sipe forming assembly 102 to form a sipe pattern (e.g., sipe pattern 641, etc.) in the tire tread 112. For example, an operator may make a selection using the input-output circuit 406 that begins the sipe forming process. The method 700 at 704 and at 706 is substantially similar to the method 500 at 504 and 506, respectively and thus not described in further detail. At 708, the first blade 616 is positioned at a first angle. The first blade 616 is actuated by the first blade actuator 632 such that the first blade 616 is at a position of the first angle. For example, the first blade 616 is actuated to the angle γ. At 710, the second blade 618 is positioned at a second angle. The second blade 618 is actuated by the second blade actuator 634 such that the second blade 618 is at a position of the second angle. For example, the second bade is actuated to the angle θ. In some embodiments, the first angle and the second angle may be the same or different.

In some embodiments, at 712, the third blade 620 is positioned at a third angle. The third angle may be same as the first angle or the second angle or may be different than the first angle or the second angle. The third blade 620 is positioned at the third angle by the third blade actuator 636. In some embodiments, at 714, the fourth blade 622 is positioned at a fourth angle. The fourth angle may be the same as the first angle, the second angle or the third angle or may be different than the first angle, the second angle or the third angle. The fourth blade 622 is positioned at the fourth angle by the fourth blade actuator 638. In some embodiments, at 716, the fifth blade 624 is positioned at a fifth angle. The fifth angle may be the same as the first angle, the second angle, the third angle or the fourth angle or may be different than the first angle, the second angle, third angle or the fourth angle. The fifth blade 624 is positioned at the fifth angle by the fifth blade actuator 640.

At 718, the plunge blade actuator 608 is operated by the controller 400 to cut the plurality of sipes (first sipe 642, the second sipe 644, the third sipe 646, the fourth sipe 648, etc.) in the tire tread 112.

At 720, the trailing roller assembly 124 engages the tire tread 112 and pulls the tire tread 112 away from the plunge cutting assembly 120. In some embodiments, the trailing roller assembly 124 is operated at a trailing feed speed greater than a leading feed speed of the leading roller assembly 122.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. In addition, two or more steps may be performed concurrently or with partial concurrence, unless specified differently above.

It is important to note that any element disclosed in one embodiment may be incorporated or utilized with any other embodiment disclosed herein. For example, the blade 204g of the exemplary embodiment described in at least paragraph [0046] may be incorporated in the second plunge fixture 322 of the exemplary embodiment described in at least paragraphs [0056] and [0057] Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An assembly for cutting sipes into a tire tread, the assembly comprising: a roller assembly configured to translate the tire tread along a tread plane at a feed speed; a plunge cutting assembly comprising: a linear actuator defining an axis along which the linear actuator is configured to operate; and a blade operably coupled to the linear actuator and configured to cut a sipe into the tire tread along the axis; and a controller operably coupled to the roller assembly and the plunge cutting assembly, the controller configured to actuate the linear actuator during tread travel based on elapsed time and the feed speed.

2. The assembly of claim 1, wherein the roller assembly comprises:
   a leading roller assembly positioned upstream of the plunge cutting assembly, the leading roller assembly comprising:
      a first leading roller; and
      a second leading roller positionable relative to the first leading roller and configured to clamp the tire tread between the first leading roller and the second leading roller; and
   a trailing roller assembly positioned downstream of the plunge cutting assembly, the trailing roller assembly comprising:
      a first trailing roller; and
      a second trailing roller positionable relative to the first trailing roller and configured to clamp the tire tread between the first trailing roller and the second trailing roller.

3. The assembly of claim 2, further comprising a rotation assembly operably coupled to the plunge cutting assembly, the rotation assembly configured to rotate the blade relative to a lateral axis of the tire tread.

4. The assembly of claim 3, wherein the plunge cutting assembly further comprises a cut plate operably coupled to the rotation assembly and configured to rotate as the blade rotates, the cut plate positioned opposite to the blade such that the cut plate engages with a surface of the tire tread opposite to the surface of the tire tread being cut by the blade, the cut plate providing a substantially flat surface against which the blade cuts the sipe.

5. The assembly of claim 2, wherein the leading rollers and the trailing rollers cooperate with the plunge cutting assembly to evenly space sipe cuts on the tire tread.

6. The assembly of claim 2, wherein at least one of the first leading roller and the second leading roller is driven by a roller driving actuator.

7. The assembly of claim 2, wherein the blade is removably coupled to the plunge cutting assembly.

8. The assembly of claim 1, further comprising:
   a rotation assembly operably coupled to the plunge cutting assembly and configured to rotate the blade relative to a lateral axis of the tire tread; and
   a cut plate operably coupled to the rotation assembly and configured to rotate as the blade rotates, the cut plate positioned opposite to the blade such that the cut plate engages with a surface of the tire tread opposite to the surface of the tire tread being cut by the blade.

9. The assembly of claim 1, wherein the blade comprises a blade edge having a first blade edge characteristic with a first profile, a second blade edge characteristic with a second profile, and a third blade edge characteristic with a third profile, wherein the third profile of the third blade edge characteristic is a different profile from the first profile of the first blade edge characteristic and the second profile of the second blade edge characteristic.

10. The assembly of claim 9, wherein the first profile of the first blade edge characteristic corresponds to the second profile of the second blade edge characteristic.

11. The assembly of claim 9, wherein the first profile and the second profile form a sawtooth profile and the third profile forms a linear profile.

12. The assembly of claim 9, wherein the first profile and the second profile form a sinusoidal profile and the third profile forms a linear profile.

13. The assembly of claim 9, wherein the first profile and the second profile form a sinusoidal profile and the third profile forms a sawtooth profile.

14. A sipe forming assembly comprising:
   a plunge cutting assembly comprising:
      a blade assembly comprising a plurality of blades and a plurality of rotary actuators, each of the plurality of blades operably coupled to a rotary actuator of the plurality of rotary actuators, each of the rotary actuators configured to independently rotate each of the plurality of blades relative a lateral axis of a tire tread; and
      a linear actuator operably coupled to the blade assembly and configured to actuate the blade assembly such that each of the plurality of blades cut a sipe in the tire tread;
   a roller assembly configured to translate the tire tread along a tread plane at a feed speed; and
   a controller operably coupled to the roller assembly and the plunge cutting assembly, the controller configured to actuate each of the rotary actuators and the linear actuator based on the feed speed.

15. The sipe forming assembly of claim 14, wherein the plunge cutting assembly is configured to operate the blade to cut sipes at between 50-100% of a thickness of the tire tread.

16. The sipe forming assembly of claim 14, wherein each of the plurality of blades comprise a blade edge, the blade edge having an edge characteristic.

17. The sipe forming assembly of claim 14, wherein the controller is further configured to rotate one of the plurality of blades to a first angle and configured to rotate another one of the plurality of blades to a second angle, the first angle being different from the second angle.

18. The sipe forming assembly of claim 14, wherein each of the plurality of blades is removably coupled to the plunge cutting assembly.

\* \* \* \* \*